United States Patent
Momchilov et al.

(10) Patent No.: US 11,303,641 B2
(45) Date of Patent: Apr. 12, 2022

(54) METHODS AND SYSTEMS FOR ACCESSING REMOTELY STORED FILES USING VIRTUAL APPLICATIONS

(71) Applicant: Citrix Systems, Inc., Fort Lauderdale, FL (US)

(72) Inventors: Georgy Momchilov, Parkland, FL (US); Mukund Ingale, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 415 days.

(21) Appl. No.: 16/405,274

(22) Filed: May 7, 2019

(65) Prior Publication Data
US 2020/0358779 A1 Nov. 12, 2020

(51) Int. Cl.
*H04L 9/40* (2022.01)
*G06F 9/455* (2018.01)
*H04L 29/06* (2006.01)

(52) U.S. Cl.
CPC ........ *H04L 63/102* (2013.01); *G06F 9/45558* (2013.01); *G06F 2009/45595* (2013.01)

(58) Field of Classification Search
CPC .............. G06F 9/45558; G06F 16/188; G06F 2209/541; G06F 2009/45595; G06F 2009/45579; G06F 9/54; G06F 9/452; H04L 63/102
See application file for complete search history.

(56) References Cited

U.S. PATENT DOCUMENTS

| | | | |
|---|---|---|---|
| 6,952,714 B2 | 10/2005 | Peart | |
| 7,117,243 B2 | 10/2006 | Peart | |
| 7,330,872 B2 | 2/2008 | Peart et al. | |
| 8,970,450 B2 | 3/2015 | Momchilov | |

(Continued)

FOREIGN PATENT DOCUMENTS

| | | | | |
|---|---|---|---|---|
| EP | 2 728 506 A1 | 5/2014 | | |
| EP | 2728506 A1 | * 5/2014 | ............ | G06F 21/41 |
| WO | WO 2013/036920 | 3/2013 | | |

OTHER PUBLICATIONS

U.S. Appl. No. 16/405,280, filed May 7, 2019, Momchilov et al.
(Continued)

*Primary Examiner* — Frantz B Jean
(74) *Attorney, Agent, or Firm* — Daly, Crowley, Mofford & Durkee, LLP

(57) ABSTRACT

A method includes retrieving, by a workspace client on a computing device, a first set of resource associations from a workspace server. The first set of resource associations identify one or more data file-types executable by each application on a virtualization server. The method also includes generating, by the workspace client, from the first set of resource associations, a second set of resource associations. The second set of resource associations identify a subset of applications on the virtualization server operable to perform operations on each of the one or more data file-types. The method further includes obtaining, by a storage provider client on the computing device, the second set of resource associations. The storage provider client is configured to enable one or more applications on the virtualization server to execute at least one data file accessible from a storage provider.

21 Claims, 13 Drawing Sheets

(56) References Cited

U.S. PATENT DOCUMENTS

| | | |
|---|---|---|
| 9,210,213 B2 | 12/2015 | Momchilov et al. |
| 9,736,221 B2 | 8/2017 | Momchilov et al. |
| 10,200,453 B2 | 2/2019 | Momchilov et al. |
| 2006/0070029 A1 | 3/2006 | Laborczfalvi et al. |
| 2011/0022812 A1* | 1/2011 | van der Linden .. H04L 67/1097 711/163 |
| 2013/0024920 A1 | 1/2013 | Rodriguez |
| 2013/0246932 A1* | 9/2013 | Zaveri ................ G06F 3/04815 715/740 |
| 2016/0127447 A1 | 5/2016 | Jiang et al. |
| 2020/0142750 A1* | 5/2020 | Kaplan ................ G06F 16/94 |

OTHER PUBLICATIONS

Search Report of the ISA dated Jun. 15, 2020 for International Application No. PCT/US2020/024180; 5 Pages.
Written Opinion of the ISA dated Jun. 15, 2020 for International Application No. PCT/US2020/024180; 10 Pages.
Search Report of the ISA dated Jun. 16, 2020 for International Application No. PCT/US2020/024181; 5 Pages.
Written Opinion of the ISA dated Jun. 16, 2020 for International Application No. PCT/US2020/024181; 10 Pages.
U.S. Appl. No. 16/227,284, filed Dec. 20, 2018, Momchilov et al.
International Preliminary Report on Patentability for App. No. PCT/US2020/024181, dated Nov. 18, 2021, 10 pages.

* cited by examiner

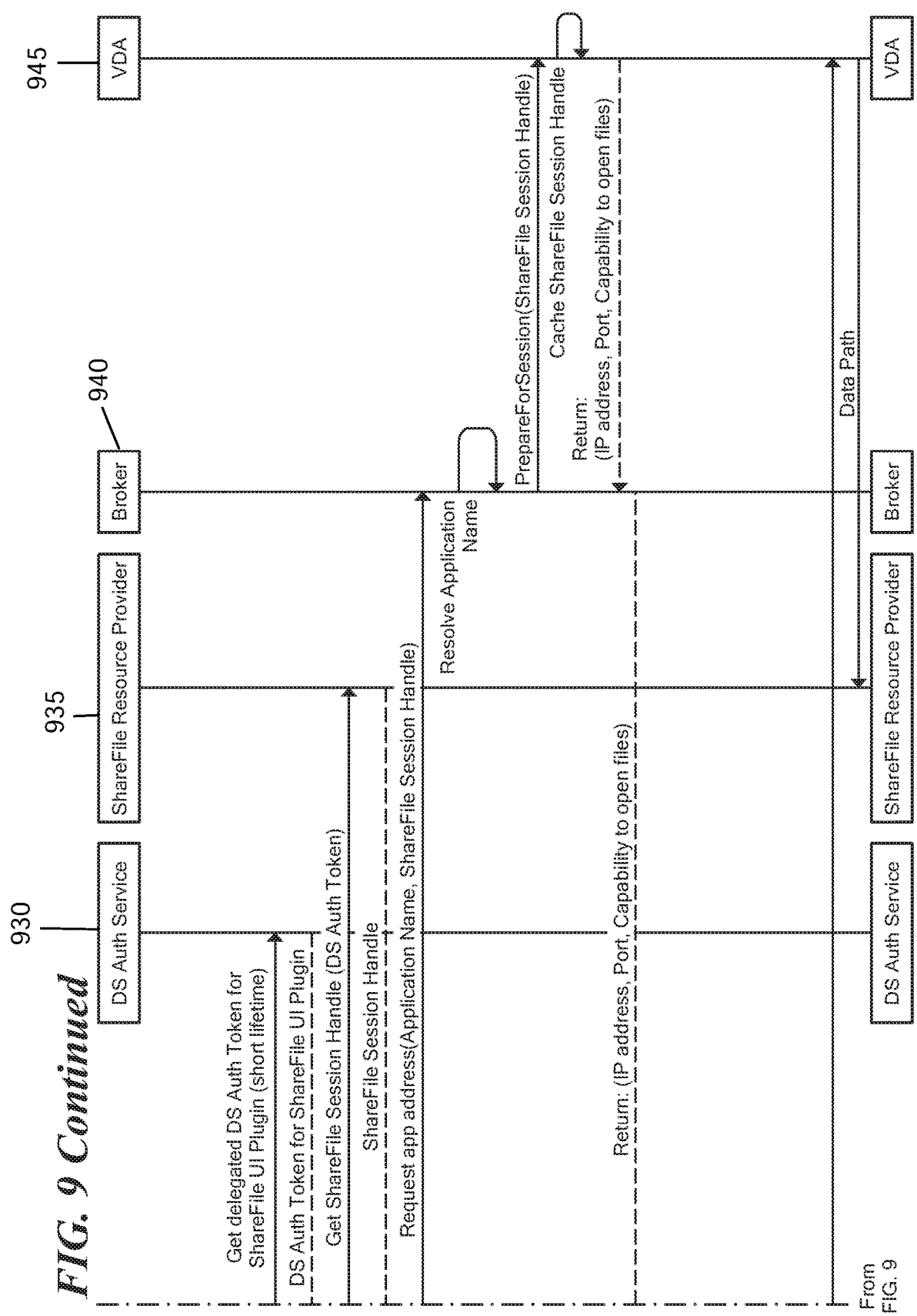

METHODS AND SYSTEMS FOR ACCESSING REMOTELY STORED FILES USING VIRTUAL APPLICATIONS

BACKGROUND

A cloud storage system refers to a form of computer data storage in which digital data is stored in logical pools as a virtual storage architecture. The physical computer data storage itself may span multiple servers (sometimes in multiple locations) to store the digital data as cloud stored data. The cloud stored data is accessed and managed by a cloud service provider.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In one aspect, a method includes retrieving, by a workspace client on a computing device, a first set of resource associations from a workspace server. The first set of resource associations identify one or more data file-types executable by each application on a virtualization server. The method also includes generating, by the workspace client, from the first set of resource associations, a second set of resource associations. The second set of resource associations identify a subset of applications on the virtualization server operable to perform operations on each of the one or more data file-types. The method further includes obtaining, by a storage provider client on the computing device, the second set of resource associations. The storage provider client is configured to enable one or more applications on the virtualization server to execute at least one data file accessible from a storage provider.

In an embodiment, the method can further include establishing, by the workspace client, a computing session with the workspace server. The workspace client retrieves applications on the virtualization server that are authorized for access by a user of the computing device.

In embodiments, the method can also include: storing, by the storage provider client, the second set of resource associations in a cache of the computing device; and clearing, by the storage provider client, the cache in response to a termination of the computing session with the workspace server. The storage provider can be a remote storage provider.

In another aspect, a method includes retrieving, by a workspace server, a first set of resource associations from a broker server. The first set of resource associations identify one or more data file-types executable by each application on a virtualization server. The method also includes generating, by the workspace server, a second set of resource associations. The second set of resource associations identify a subset of applications on the virtualization server operable to perform operations on each of the one or more data file-types. The method further includes obtaining, by a storage provider client on the workspace server, the second set of resource associations. The storage provider client is configured to enable one or more applications on the virtualization server to execute at least one data file accessible from a storage provider.

In embodiments, the method can further include establishing, by the workspace server, a computing session with the broker server. The workspace server can retrieve applications on the virtualization server that are authorized for access by a user of a computing device in communication with the workspace server.

In further embodiments, the method can further include: storing, by the storage provider client, the second set of resource associations in a cache of the workspace server; and clearing, by the storage provider client, the cache in response to a termination of the computing session with the broker server. The storage provider can be a remote storage provider.

In other aspects, a method includes receiving, by a workspace server, a request from a computing device for an application on a virtualization server. The request includes an application identifier (ID) and a file-path to a data file on a storage provider and on which the application is to perform operations. The method also includes obtaining, by the workspace server, a session handle from the storage provider. The session handle includes information which enables access to the storage provider by the computing device from a computing session between the computing device and the virtualization server. The method further includes generating, by the workspace server, a connection description file including information to establish the computing session and a data session, wherein the computing session is between the computing device and the virtualization server and the data session is between the virtualization server and the storage provider. In addition, the method includes providing, by the workspace server, the connection description file to the computing device such that execution of the connection description file enables a user of the computing device to perform operations on the data file using the application provided by the virtualization server.

In an embodiment, the method can further include issuing, by the workspace server, a request to an authentication platform for an authorization token for use by the computing device to access the data file accessible from the storage provider. The request can include at least a credential of the user and the file-path to the data file.

In another embodiment, the method can also include obtaining the session handle by sending, by the workspace server, a request to the storage provider for the session handle. The request can include the authorization token. The authorization token can provide the computing device access to the data file for a limited time.

In other embodiments, the method can include retrieving, by the workspace server, an address for the application on the virtualization server from a broker server in communication with the virtualization server. The path to the storage provider can be a path to a remote storage.

In embodiments, the data file can be presented to the user via an attachment to an electronic mail (e-mail) message from an e-mail client on the computing device. In response to the user's selection of the attachment, the e-mail client can upload the data file to the storage provider. Accordingly, the method can further include receiving, by the workspace server, the request for the application from the e-mail client to preview the data file from a user interface (UI) of the e-mail client.

In some embodiments, the method can include generating the connection description file by providing, by the workspace server, the application ID and the session handle to the virtualization server.

In further embodiments, in response to receiving the application ID and the file-path, a virtual machine can be established by the virtualization server. The virtual machine can be established with computing hardware and/or software resources to establish the computing session with the computing device; and establish the data session with the storage provider such that the application can enable the user of the computing device to perform the operations on the data file accessible from the storage provider.

In additional embodiments, execution of the application in the computing session can be delayed by the virtual machine until the data session is established. The computing session can also be prevented from termination by the virtual machine until save operations in the data session are complete.

In further aspects, a non-transitory computer-readable medium includes computer-executable instructions, which when executed by one or more processors, cause the one or more processors to retrieve a first set of resource associations from a workspace server. The first set of resource associations identifying one or more data file-types executable by each application on a virtualization server. The computer-executable instructions also cause the one or more processors to generate a second set of resource associations. The second set of resource associations identifying a subset of applications on the virtualization server operable to perform operations on each of the one or more data file-types. The second set of resource associations enables one or more applications on the virtualization server to execute at least one data file accessible from a storage provider.

In an embodiment, the non-transitory computer-readable medium can further include computer-executable instructions that, when executed, cause the one or more processors to: establish a computing session with the workspace server; and retrieve applications on the virtualization server that are authorized for access by a user of a computing device.

In another embodiment, the non-transitory computer-readable medium can also include computer-executable instructions that, when executed, cause the one or more processors to store the second set of resource associations in a cache; and clear the cache in response to a termination of the computing session with the workspace server. The storage provider can be a remote storage provider.

In yet another aspect, a non-transitory computer-readable medium includes computer-executable instructions, which when executed by one or more processors, cause the one or more processors to retrieve a first set of resource associations from a broker server. The first set of resource associations identify one or more data file-types executable by each application on a virtualization server. The computer-executable instructions also cause the one or more processors to generate a second set of resource associations. The second set of resource associations identify a subset of applications on the virtualization server operable to perform operations on each of the one or more data file-types. The second set of resource associations enables one or more applications on the virtualization server to execute at least one data file accessible from a storage provider.

In an additional aspect, a non-transitory computer-readable medium comprising computer-executable instructions, which when executed by one or more processors, cause the one or more processors to receive a request from a computing device for an application on a virtualization server. The request includes an application identifier (ID) and a file-path to a data file stored on a storage provider and on which the application is to perform operations. The computer-executable instructions also cause the one or more processors to obtain a session handle from the storage provider. The session handle includes information which enables access to the storage provider by the computing device from a computing session between the computing device and the virtualization server. The computer-executable instructions further cause the one or more processors to generate a connection description file including information to establish the computing session and a data session, wherein the computing session is between the computing device and the virtualization server and the data session is between the virtualization server and the storage provider; and provide the connection description file to the computing device such that execution of the connection description file enables a user of the computing device to perform operations on the data file using the application provided by the virtualization server.

In embodiments, the non-transitory computer-readable medium can further include computer-executable instructions that, when executed, cause the one or more processors to issue a request to an authentication platform for an authorization token for use by the computing device to access the data file accessible from the storage provider. The request can include at least a credential of the user and the file-path to the data file.

In additional embodiments, the non-transitory computer-readable medium can also include computer-executable instructions that, when executed, cause the one or more processors to obtain the session handle by sending a request to the storage provider for the session handle. The request includes the authorization token. The authorization token can provide the computing device access to the data file for a limited time.

In further embodiments, the non-transitory computer-readable medium cam include computer-executable instructions that, when executed, cause the one or more processors to retrieve an address for the application on the virtualization server from a broker server in communication with the virtualization server. The path to the storage provider can be a path to a remote storage.

In an embodiment, the data file can be presented to the user via an attachment to an electronic mail (e-mail) message from an e-mail client on the computing device. In response to the user's selection of the attachment, the e-mail client can upload the data file to the storage provider. In addition, the non-transitory computer-readable medium can further include computer-executable instructions that, when executed, cause the one or more processors to receive the request for the application from the e-mail client and wherein the request includes a request to preview the data file from a user interface (UI) of the e-mail client.

In another embodiment, the non-transitory computer-readable medium can also include computer-executable instructions that, when executed, cause the one or more processors to generate the connection description file by providing the application ID and the session handle to the virtualization server.

In an aspect, a device includes a memory and one or more processors coupled to the memory. The one or more processors are configured to retrieve, using a workspace client stored in the memory, a first set of resource associations from a workspace server. The first set of resource associations identify one or more data file-types executable by each application on a virtualization server. The one or more processors are further configured to generate, using the workspace client, a second set of resource associations. The second set of resource associations identify a subset of applications on the virtualization server operable to perform operations on each of the one or more data file-types. The one or more processors are also configured to obtain, using a storage provider client stored in the memory, the second set of resource associations. The storage provider client is configured to enable one or more applications on the virtualization server to execute at least one data file accessible from a storage provider.

In an embodiment, the one or more processors can be further configured to: establish, using the workspace client, a computing session with the workspace server; and retrieve, using the workspace client, applications on the virtualization server that are authorized for access by a user of a computing device.

In another embodiment, the one or more processors can also be configured to store, using the storage provider client, the second set of resource associations in a cache coupled to the one or more processors; and clear, using the storage provider client, the cache in response to a termination of the computing session with the workspace server. The storage provider can be a remote storage provider.

In other aspects, a server includes a memory and one or more processors coupled to the memory. The one or more processors are configured to retrieve a first set of resource associations from a broker server. The first set of resource associations identify one or more data file-types executable by each application on a virtualization server. The one or more processors are also configured to generate a second set of resource associations. The second set of resource associations identify a subset of applications on the virtualization server operable to perform operations on each of the one or more data file-types. Additionally, the second set of resource associations enables one or more applications on the virtualization server to execute at least one data file accessible from a storage provider.

In embodiments, the one or more processors can be further configured to: establish a computing session with the broker server; and retrieve applications on the virtualization server that are authorized for access by a user of a computing device in communication with the virtualization server.

In other embodiments, the one or more processors can also be configured to: store the second set of resource associations in a cache coupled to the one or more processors; and clear the cache in response to a termination of the computing session with the broker server. The storage provider can be a remote storage provider.

In an additional aspect, a server includes a memory and one or more processors coupled to the memory. The one or more processors are configured to receive a request from a computing device for an application on a virtualization server. The request includes an application identifier (ID) and a file-path to a data file stored on a storage provider and on which the application is to perform operations. The one or more processors are also configured to obtain a session handle from the storage provider. The session handle includes information which enables access to the storage provider by the computing device from a computing session between the computing device and the virtualization server, The one or more processors are further configured to generate a connection description file including information to establish the computing session and a data session, wherein the computing session is between the computing device and the virtualization server and the data session is between the virtualization server and the storage provider; and provide the connection description file to the computing device such that execution of the connection description file enables a user of the computing device to perform operations on the data file using the application provided by the virtualization server.

In embodiments, the one or more processors can be further configured to issue a request to an authentication platform for an authorization token for use by the computing device to access the data file accessible from the storage provider. The request can include at least a credential of the user and the file-path to the data file.

In additional embodiments, the one or more processors can be further configured to obtain the session handle by sending a request to the storage provider for the session handle. The request can include the authorization token. The authorization token can provide the computing device access to the data file for a limited time.

In other embodiments, the one or more processors can also be configured to retrieve an address for the application on the virtualization server from a broker server in communication with the virtualization server. The path to the storage provider can be a path to a remote storage.

In further embodiments, the data file can be presented to the user via an attachment to an electronic mail (e-mail) message from an e-mail client on the computing device. In response to the user's selection of the attachment, the e-mail client can upload the data file to the storage provider. Accordingly, the one or more processors can be configured to receive the request for the application from the e-mail client and wherein the request includes a request to preview the data file from a user interface (UI) of the e-mail client.

In another embodiment, the one or more processors can be configured to generate the connection description file by providing the application ID and the session handle to the virtualization server.

In embodiments, in response to receiving the application ID and the file-path, a virtual machine can be established by the virtualization server. The virtual machine can be established with computing hardware and/or software resources to establish the computing session with the computing device; and establish the data session with the storage provider such that the application can enable the user of the computing device to perform the operations on the data file accessible from the storage provider.

In additional embodiments, execution of the application in the computing session can be delayed by the virtual machine until the data session is established. Additionally, the computing session can be prevented from termination by the virtual machine until save operations in the data session are complete.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In the following description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," "and similar terms, is meant to include both direct and indirect connecting and coupling.

Computing Architecture

Figure 1:
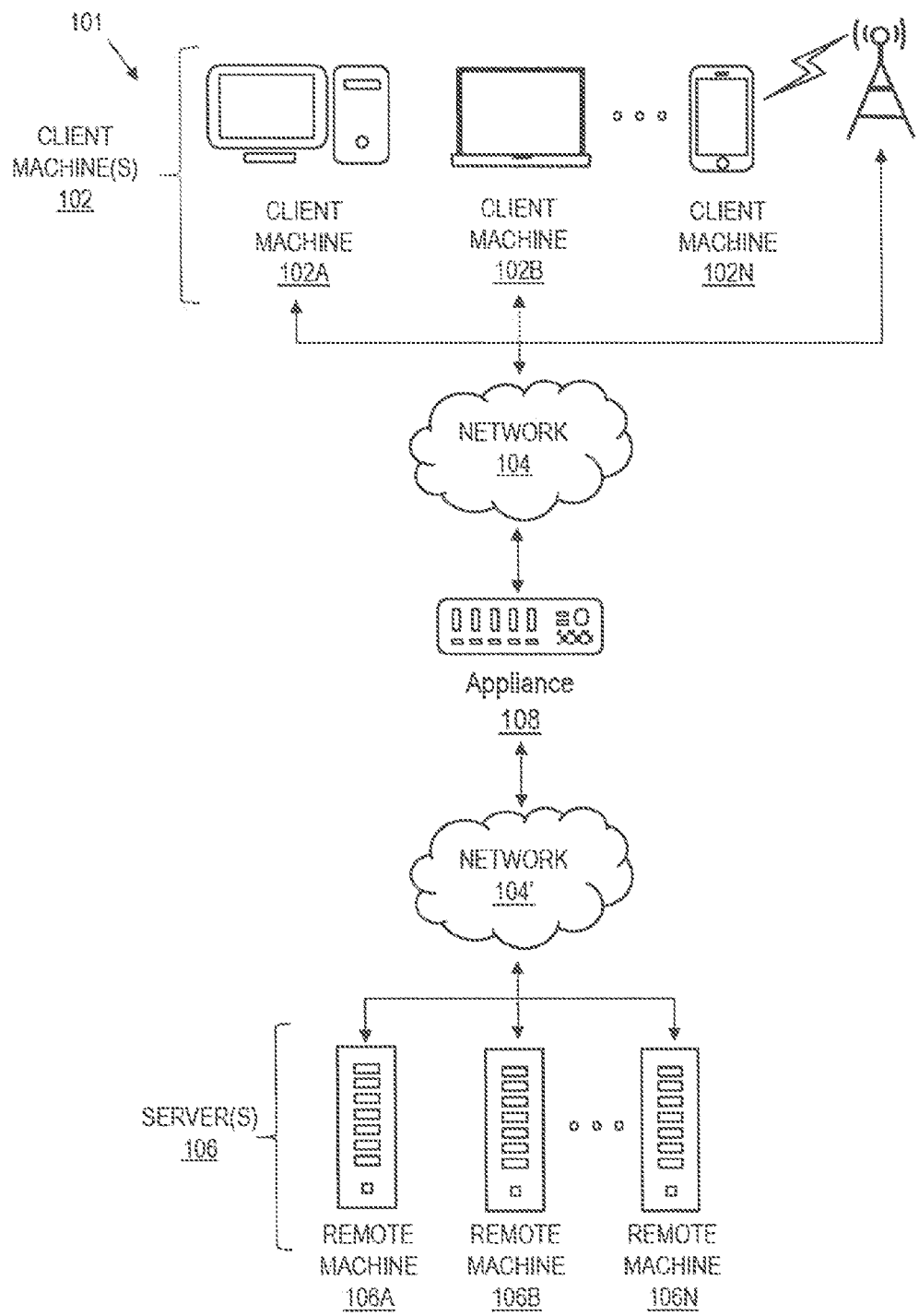
FIG. 1 is a block diagram of a network environment of computing devices in which various aspects of the disclosure may be implemented in accordance with one or more illustrative aspects of the concepts described herein.

Regarding FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
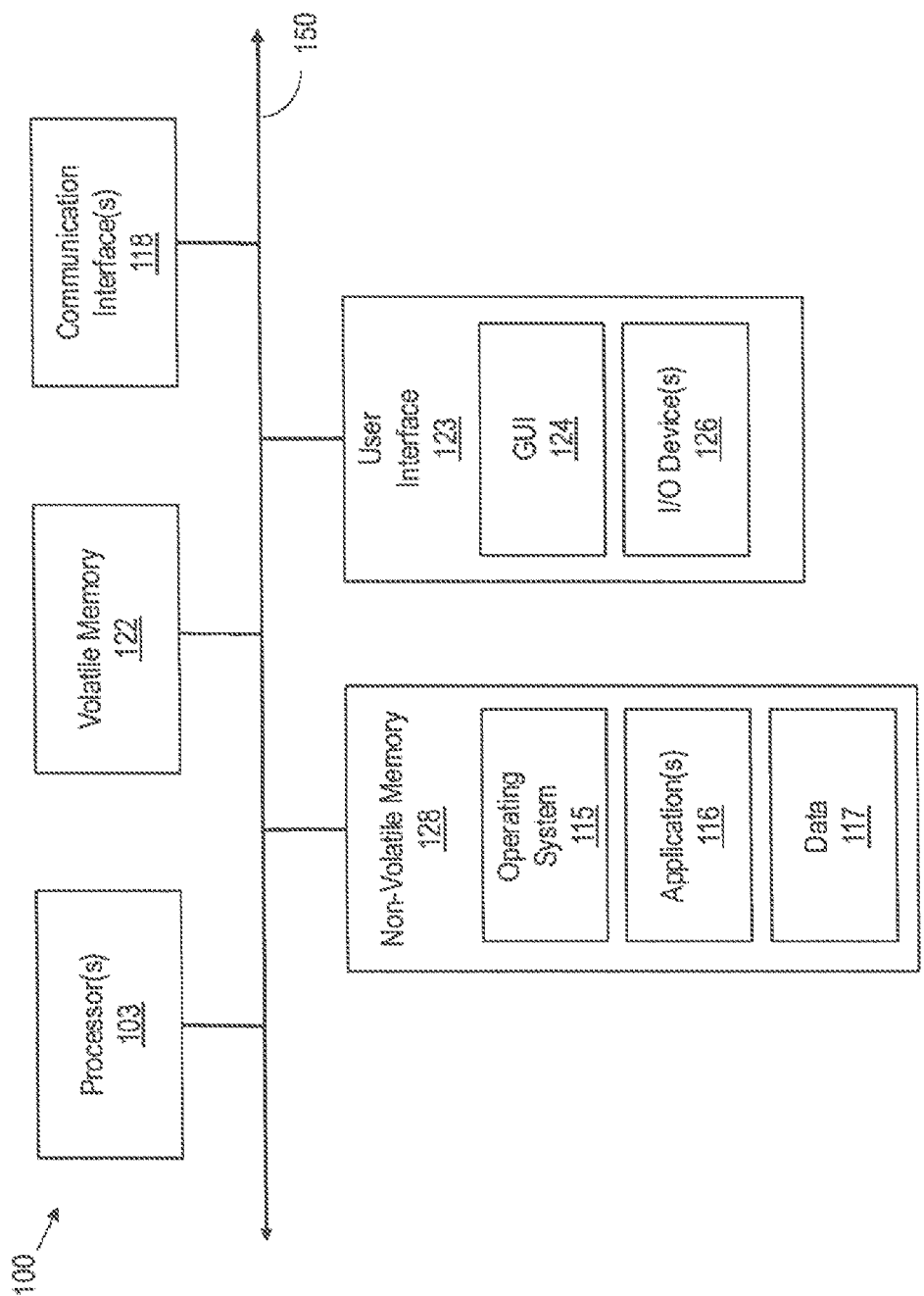
FIG. 2 is a block diagram of a computing device in accordance with one or more illustrative aspects of the concepts described herein.

Regarding FIG. 2, client devices 102, appliances 108 and/or servers 106 of FIG. 1 can be substantially similar to computing device 100. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Generating Data File-Type Associations & Opening Cloud-Stored Files Using Virtual Applications Workspace virtualization is a way of distributing applications to client computers using application virtualization (e.g., using software technology to encapsulate computer programs from the underlying operating system on which they are executed). Accordingly, workspace virtualization is an approach that encapsulates and isolates an entire computing workspace. In one example, a workspace includes those elements above an operating system kernel (e.g., applications, data, settings, and any non-privileged operating system subsystems required to provide a functional desktop computing environment). Thus, workspace virtualization enables applications within the workspace to interact with each other.

A user of a client device can establish a computing session with one or more servers that host a virtual application (e.g., Microsoft Word®). To access the one or more servers, the user establishes the computing session with the one or more servers by providing the one or more servers with authentication credentials. The authentication credentials can include, for example, a user name and password. Once the user establishes the computing session, the user may require a document file or other resource stored by a remote storage provider (also referred to herein as a "cloud-storage provider").

To access the document file, the user establishes a data session with the remote storage provider from the computing session. Because the remote storage provider does not have access to the authentication credentials used by the user to establish the computing session, the remote storage provider requires input of the user's authentication credentials.

Thus, in conventional systems, users can only establish the data session by manually entering their authentication credentials to access the remote storage provider. For example, the remote storage provider does not know that the user has been authenticated because authentication to the computing session normally requires actual credentials, e.g. AD credentials (user name, password), which are different from the set of credentials used for authentication to the Remote Storage Provider, e.g. email address and a different password.

In contrast, the client device, by authenticating to Workspace, with the help of the Authentication Platform (server), has the ability to map the authenticated user identity across other resource providers that have securely opted into the shared Authentication Platform, not just the Broker as a resource provider for published virtual apps and desktops. For example, the Remote Storage Provider is another instance of a resource provider. The Broker and the Remote Storage Provider are a.k.a. "relying parties" in terms of their use of the Authentication Platform. The bootstrapping of different cloud services as resource providers that become "relying parties" is normally performed with service keys that are securely provided to administrators of these cloud services. The bootstrapping also includes registration of public keys. Thus, these service keys are small and finite in number, normally one or two keys per relying party that may sometimes be rotated.

For an Authentication Platform to generate a Dropbox and/or Onedrive token, for example, DropBox and/or One-Drive cloud services would each have to join the Authentication Platform and become a "relying party", e.g. by registering with service keys and respective public keys. The Authentication Platform would then be able to encrypt the authentication token (the aforementioned "piece of data") such that only the corresponding cloud service (e.g. Drop-Box or OneDrive) is able to decrypt and verify.

The VDAs that host the computing sessions are vast in number and in some cases have limited lifetime, e.g. pooled VDAs that are created on the fly by Machine Creation Services (MCS) by combining together physical hardware or VMs plus OS and user layers, etc. In some instances, a pooled VDA is destroyed and recreated every time a user logs off, thus keeping it "ever green" and secure for the next user. This is also the case with Citrix Secure Browser, where a new LINUX VDA is recreated every time the user closes (logs off) the Secure Browser.

Therefore, a potential use of service keys with VDAs would present a scalability and administration challenge and is thus impractical. Therefore, VDAs themselves do not become a "relying party" of the Authentication Platform.

As a solution to this problem, as described further in this application, an authentication token is first obtained from the Authentication Platform, such that it can be used with another specific relying party (the Remote Storage Provider in this case). The authentication token is formed such that it can only be used by the designated relying party, e.g. the contents are encrypted with a symmetric key, which is then encrypted with the relying party's public key. Thus, the authentication token contents can only be decrypted and read by the relying party. Then, the authentication token is used to obtain a session handle from the Remote Storage Provider.

This session handle could be then deposited at the resolved VDA (as discussed in an illustrative example method described herein). Alternatively, the session handle could be supplied over a computing session such as an HDX computing session (as discussed in another illustrative example described at least in conjunction with FIG. 10 as "Option: Storage Provider Session Handle").

The difficulty with SSOn is the aspect of first obtaining the session handle, then securely storing the session handle at the resolved VDA to be later advantageously reused by the Remote Storage Provider Drive Mapper at the VDA only after the user has securely logged into the VDA via the computing session and is trusted.

As described in greater detail herein, embodiments of the present disclosure are directed toward sharing authentication credentials between one or more cloud-storage providers and the one or more servers that host virtual applications such that users are able to seamlessly access virtual applications to perform operations on data files accessible from the cloud-storage providers. In embodiments, authentication credentials are shared using a session handle.

Figure 3:
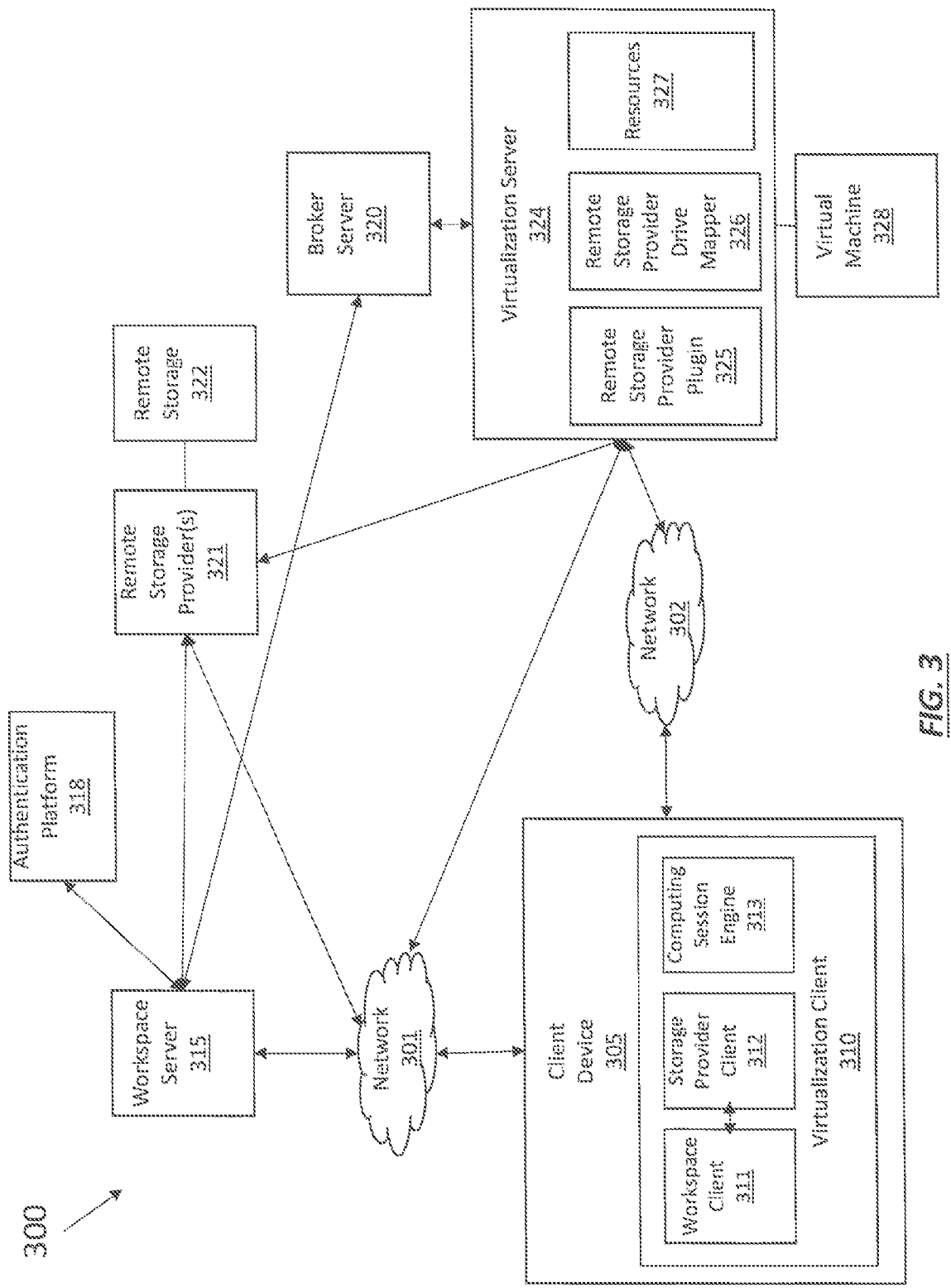
FIG. 3 depicts an illustrative operating environment in accordance with one or more illustrative aspects of the concepts described herein.

Regarding FIG. 3, a computing environment 300 includes a client device 305 communicatively coupled to servers 315, 321, 324 via networks 301, 302. The computing environment 300 can be a cloud computing environment (e.g., such as network environment 101 of FIG. 1) and the client device 305 and servers 315, 321, 324 can be configured to operate substantially similar to client machines 102 and servers 106 of FIG. 1. The networks 301, 302 can be substantially similar to networks 104, 104' of FIG. 1.

In embodiments, a user of the client device 305 may wish to open a file stored on a remote storage 322 using one or more resources 327 on a virtualization server 324. Resources 327 can include but are not limited to software applications ("apps"), virtual desktops, documents, files, networks, servers, storage, and services. For example, the user may wish to view and/or perform operations on the file (e.g., a Microsoft Word document) stored on the remote storage 322 using an app (e.g., Microsoft Word). A remote storage provider 321 can be a cloud-storage service such as ShareFile® and Dropbox™ that manages access to files stored on the remote storage 322. The remote storage 322 can be cloud storage or any storage or any device capable of storing electronic data as described in FIG. 2.

In an example, the server 315 (also referred to herein as a workspace server 315) is configured to manage computing sessions for the resources 327 and other resources such as files stored by the remote storage provider 321.

To establish a computing session for one or more of the resources 327, the user establishes a workspace session with the workspace server 315 by executing a workspace client 311 of a virtualization client 310 on the client device 305. The workspace client 311 executes one or more authentication and workspace session protocols (e.g., such as the Delivery Services Authentication (DS Auth) protocol by Citrix and the StoreFront (SF) Services a.k.a. Workspace Services protocol by Citrix) to establish the workspace session.

In embodiments, the workspace client 311 can be implemented as a receiver for Web JavaScript (JS) and/or a native application on the client device 305. A receiver for Web JS can be a JS received from the workspace server 315 and capable of executing the authentication and workspace session protocols.

In embodiments, the receiver for Web JS could execute in the context of an independent browser local to client device 305 (e.g. such as the JS part of the Receiver for Web or HTML5 Receiver by Citrix).

In other embodiments, the receiver for Web JS could also execute in the context of an embedded browser part of a native application (e.g. the Chromium Embedded Framework (CEF)-based browser part of the native Citrix Workspace App (CWA)). In addition, the receiver for Web JS is capable of rendering a UI of enumerated resources, e.g. enumerated published virtual apps and desktops.

Advantageously, since it is entirely or substantially web-based, the rendered UI could be easily modified, kept up-to-date and rebranded (e.g. with customer-specific logos, color schemes, etc. as opposed to appearing to be provided by the workspace cloud service provider such as Citrix).

In embodiments, the use of native application has the added advantage of native integrations and extended feature sets that may otherwise not be possible or allowed from within a local browser.

In embodiments, the extended features may include the creation of local desktop shortcuts or start menu items representative of the published virtual applications and desktops, running a native computing session engine 313 (e.g. the native HDX engine from Citrix) with higher performance characteristics and better UX as opposed to a web-based computing session engine 313 (e.g. the web-based HTML5 HDX engine from Citrix), supporting advanced features such as USB device redirection into a virtual environment, "seamless" published virtual application windows, taskbar grouping of published virtual applications, etc.

In embodiments, the use of a native application (e.g. CWA by Citrix) however may require explicit installation and in some cases additional configuration, while the purely web-based approach (e.g. HTML5 Receiver by Citrix) does not require any additional installations and may therefore be practical and preferred despite more limited performance and feature set. The functionality of the receiver for Web JS and the native application are discussed in further details in the illustrative process flows of FIGS. 8-9.

In response to receiving a request from the workspace client 311 to establish the workspace session, the workspace server 315 can authenticate a user of the client device 305 by sending the user's authentication credentials (e.g., user name and password) to an authentication platform 318, which can be a server such as the servers 106 of FIG. 1. The authentication platform 318 (e.g. the Citrix Cloud Identity Platform, Microsoft Azure AD, on-prem customer AD accessed via cloud connectors, etc.) verifies the user's authentication credentials by performing a look-up of, e.g., a look-up table, database or other structure that identifies the user identity. Upon successful authentication, the authentication platform 318 can return to the workspace server 315 a primary authentication token, which provides authorization and defines the user's resource type entitlements. In other embodiments, a primary authentication token may be directly provided by the workspace client 311 to the workspace server 315 based on prior authentication.

Based on the verified user identity, the workspace server 315 can then determine the resource types the user is authorized to access, e.g. published virtual applications and desktops, cloud-stored files, etc. Furthermore, the workspace server 315 can then contact the respective resource provider servers, e.g. the broker server 320 and the remote storage provider 321, to enumerate a list of one or more specific resources the user is entitled to (or authorized to access) from each resource provider respectively. The broker server 320 and the remote storage provider 321 can be servers such as the servers 106 of FIG. 1. The workspace server 315 can then present the one or more enumerated resources to the user via the workspace client 311.

Generating File-Type Associations

Additionally, upon verification of the user's authentication credentials, the workspace client 311 or the workspace server 315 can generate data file-type associations that enable one or more apps stored by the virtualization server 324 to execute one or more files stored by or accessible from the remote storage provider 321.

In one example embodiment, the workspace client 311 receives a notification from the workspace server 315 that the user's credentials have been authenticated. Following receipt of the notification, the workspace client 311 retrieves a set of resource associations (e.g. a first set of resource associations) that identifies the data file-types of the resources 327 (e.g., apps) executable from the workspace server 315. The resource associations can be data structures including, but not limited to, an array, table, tree, or list. In some embodiments, the first set of resource associations may comprise application File Type Associations (FTAs). Using the first set of resource associations, the workspace client 311 generates another set of resource associations (e.g. a second set of resource associations) that identifies a subset of the resources 327 that can execute, e.g. open for viewing, edit, saving, etc., each data file-type. An element of the first set of resource associations could, for example, be in the form [App N, list of FTAs for App N], while an element of the second set of resource associations could, for example, be in the form [File Type N, list of Apps]. The elements of the first set of resource associations and/or the elements of the second set of resource associations could be represented as JSON objects. As another more concrete example, the first set of resource associations could comprise {[Winword.exe, {.doc, .docx, .dotm, .dotx, .pdf, .rtf, .xml, .txt}], [Notepad.exe, {.m, .ps1, .puml, .txt}], . . . }, in which case the second set of resource associations could comprise {[.doc, {Winword.exe}], [.docx, {Winword.exe}], [.dotm, {Winword.exe}], [.dotx, {Winword.exe}], [.pdf, {Winword.exe}], [.rtf, {Winword.exe}], [.xml, {Winword.exe}], [{.m, {Notepad.exe}], [.ps1, {Notepad.exe}], [.puml, {Notepad.exe}], [.txt, {Winword.exe, Notepad.exe}]}. In other words, in this concrete example, most data file-types can be executed with only a single option of a resource 327, i.e. a single published virtual application (Winword.exe or Notepad.exe but not both), while the .txt data file-type can be executed with a choice of either Winword.exe or Notepad.exe as a published virtual application.

A storage provider client 312 configured to allow the user to access files stored by the remote storage provider 321 obtains the second set of resource associations from the workspace client 311. The storage provider client 312 can be a user interface (UI) plugin that presents (e.g., via a touchscreen of the client device 305) selectable icons representing the files stored by or accessible from the remote storage provider 321. In this context, a UI plugin can be defined as an add-on component extending the functionality of the workspace client 311 with additional functionality specific to a resource provider client, e.g. the storage provider client 312. A UI plugin could take the form of JS, HTML, CSS, etc. and could communicate with the workspace client 311 via well-defined set of interfaces. In some embodiments, UI plugins for the workspace client 311 could be Citrix's ShareFile UI Plugin, Drobox's UI Plugin, and Microsoft's OneDrive UI Plugin. In some embodiments, the interface available to UI plugins may include API to return the second set of resource associations from the workspace client 311, e.g. the list of data file-types and associated lists of published virtual applications (resources 327) operable to execute each corresponding data file-type.

In another example embodiment, the workspace server 315 retrieves, from a broker server 320, a first set of resource associations that identifies the data file-types of the resources 327 (e.g., apps) executable from the workspace server 315. The broker server 320 negotiates computing session launch requests from a client device 305 via the workspace server 315 for the one or more resources 327. The negotiation may include or be preceded by enumeration of resources 327 that a user authenticated to workspace server 315 is allowed to access. Using the first set of resource associations, the workspace server 315 generates a second set of resource associations that identifies a subset of the resources 327 capable of executing each data file-type (in embodiments, generation of the second set of resource associations from the first set of resource associations may be accomplished in a manner which is the same as or similar to, the techniques previously described hereinabove in the context of workspace client and storage provider client). The remote storage provider 321 can obtain the second set of resource associations from the workspace server 315. The remote storage provider 321 can use the second set of resource associations to provide an end user or another service with an option to execute a cloud-stored file with one of the resources 327.

Opening Cloud-Stored Files Using Virtual Applications

In embodiments, the workspace server 315 can receive a request from a user for one of the resources 327 to execute a data file stored by the remote storage provider via, e.g., the workspace client 311. The request can include a resource identifier and a file-path to a location of the data file in the remote storage 322. In some embodiments, the remote storage could be file storage provided by Citrix's ShareFile (a.k.a. Citrix Files), Drobox, Microsoft OneDrive, etc., and may be backed by cloud file storage in Microsoft Azure, Amazon Web Services (AWS) or other cloud platform. In an embodiment, the resource identifier can be a string of unique alphanumeric characters, or any other unique code, that can identify a specific resource. For example, the alphanumeric string "A001" can identify an application, e.g., Microsoft Word stored by the virtualization server 324.

Figure 8:
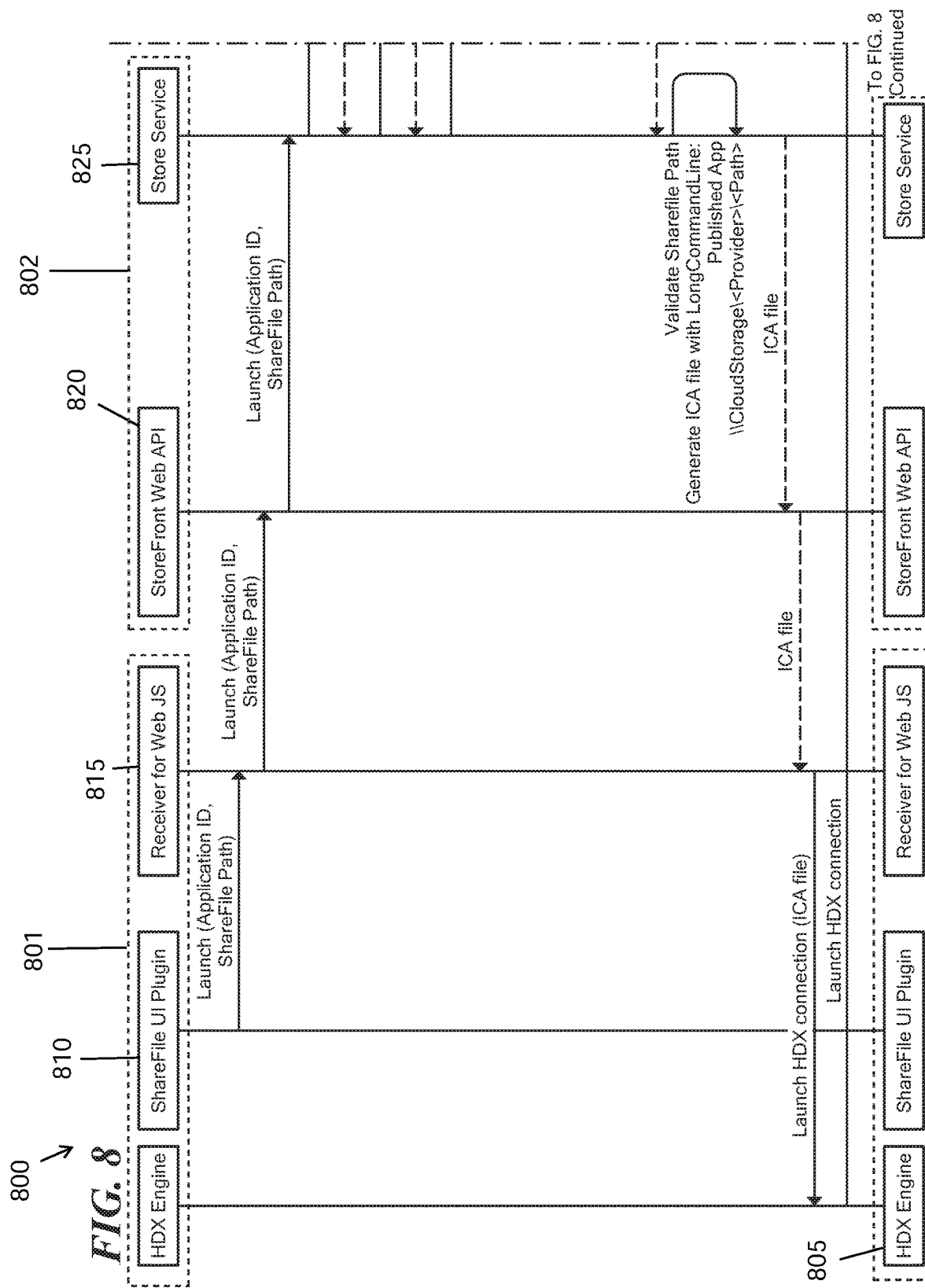
FIG. 8 is an illustrative process flow that relates to accessing and/or operating on files stored in remote storage using a virtual application in accordance with one or more illustrative aspects of the concepts described herein.
Figure 8:
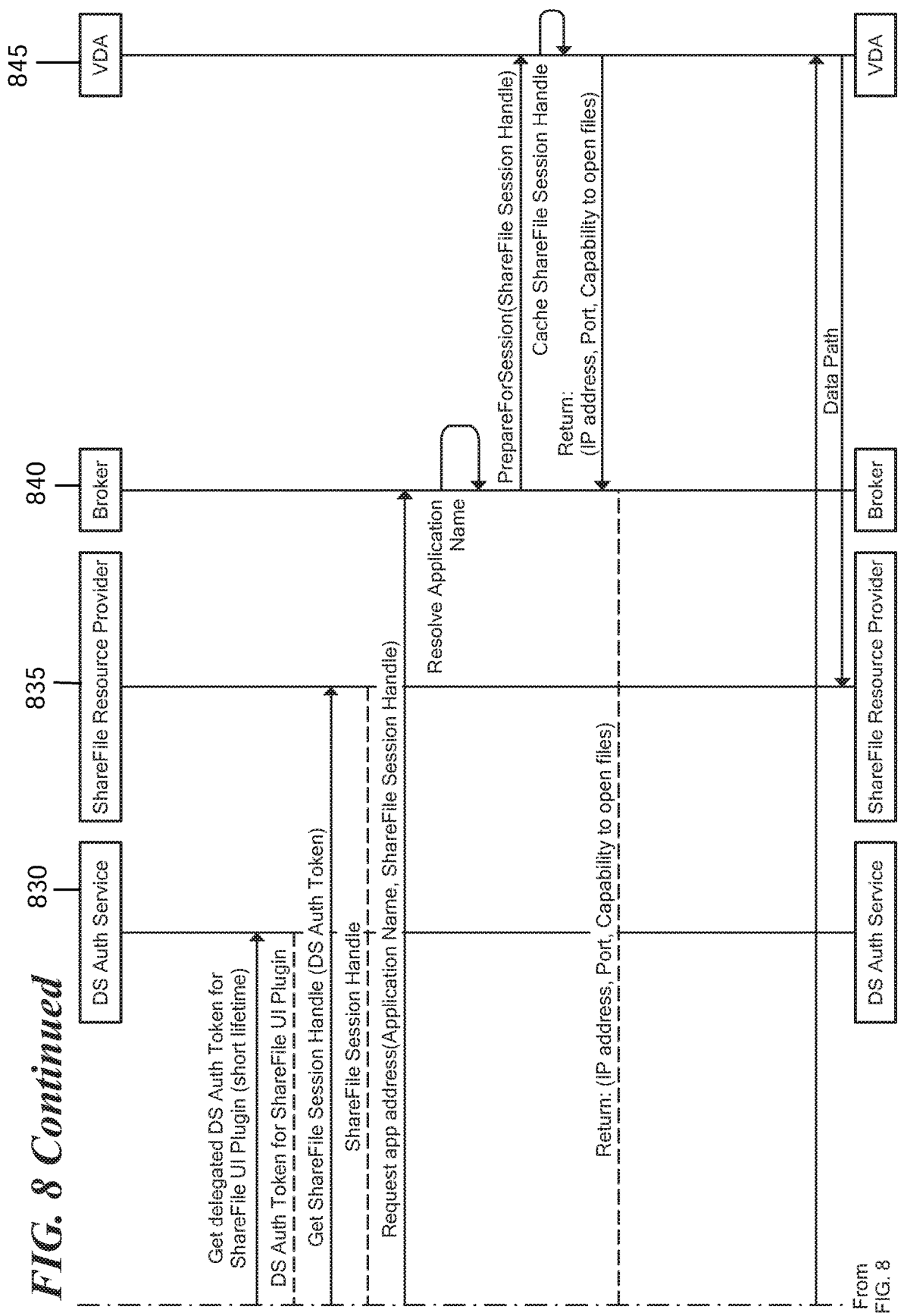
Figure 9:
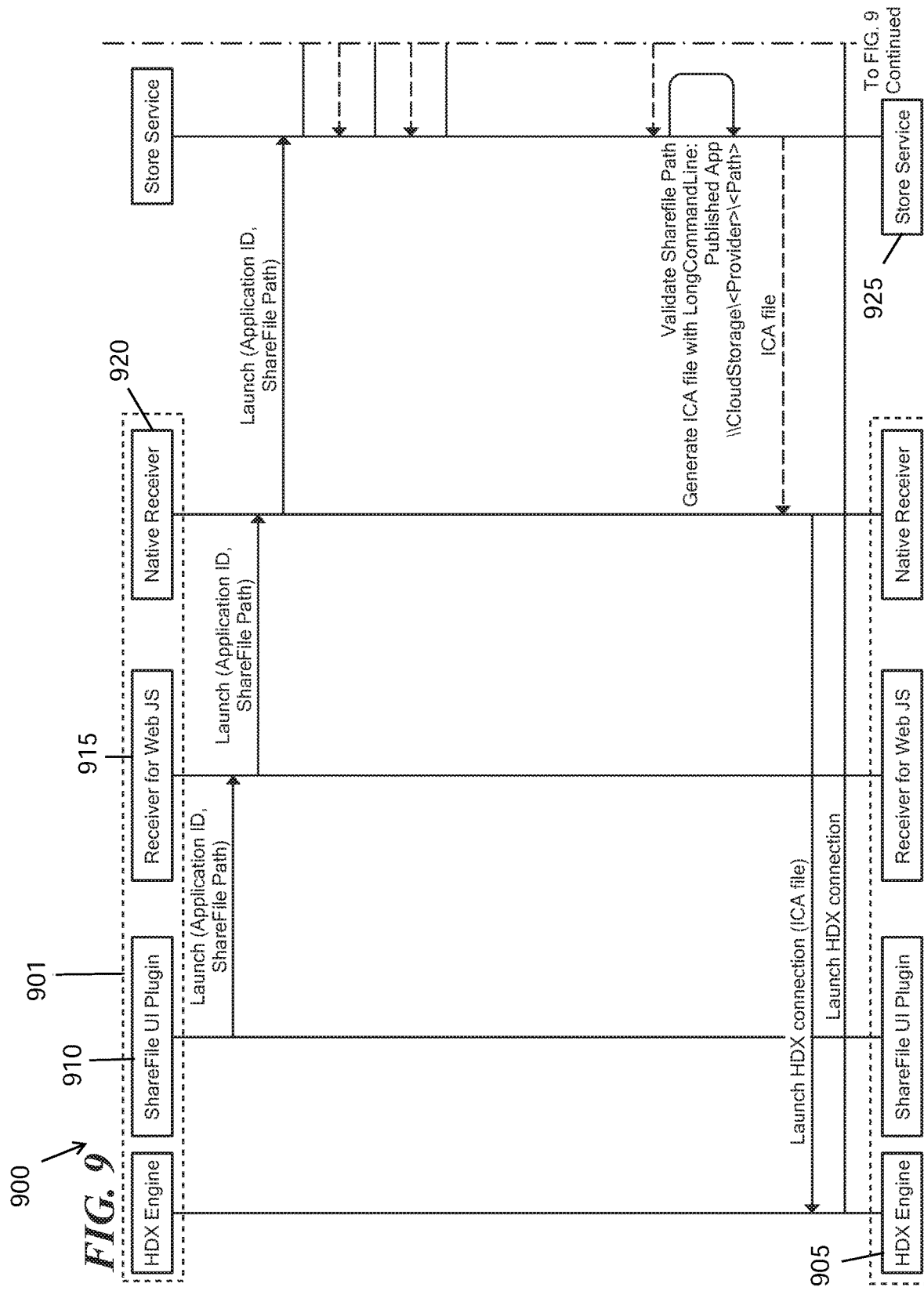
FIG. 9 is another illustrative process flow that relates to accessing and/or files stored in remote storage using a virtual application in accordance with one or more illustrative aspects of the concepts described herein.

Upon receiving the request, the workspace server 315 obtains a remote storage authentication token (i.e. a piece of data which can be used to verify authenticity) from the authentication platform 318 as described in greater detail with respect to FIGS. 8-9. Using the remote storage authentication token, the workspace server 315 retrieves a remote storage session handle from the remote storage provider 321 as also described in greater detail with respect to FIGS. 8-9. In embodiments, the remote storage session handle may contain or point to encrypted data blob containing information identifying customer ID, user ID, user virtual (e.g. highly available, distributed, replicated, etc.) folder or a set of virtual folders, access permissions (e.g. read and/or write), issue date and time, expiration date and time, and any additional access control or telemetry information that may be necessary for securely establishing a data session with the remote storage provider 321 on behalf of the authenticated user. In some embodiments, the remote storage session handle may be a randomly generated number used as a pointer or index within a table holding the aforementioned encrypted data blob. The workspace server 315 sends a request to the broker server 320 for an address of the requested resource that includes the remote storage session handle.

Responsive to receiving the request, the broker server 320 resolves a name (e.g., an application name) of the requested resource as further described below. The broker server 320 sends a command to the virtualization server 324 to prepare for a computing session with the client device 305 for the requested resource. In embodiments, the command can include the remote storage session handle.

In response to receiving the command, the virtualization server 324 caches the remote storage session handle and establishes a virtual machine 328 to host and execute the requested resource from the resources 327. To that end, the virtualization server 324 can provision physical and/or software computing resources needed to execute the requested resource. For example, the virtualization server 324 can include a hypervisor (not shown) that allocates the physical and/or computing resources included in hardware and/or software layers (not shown) of the virtualization server 324 needed to execute the requested resource. Once the virtual machine 328 is established, the virtualization server 324 returns, to the broker server 320, information required to establish the computing session between the client device 305 and the virtual machine 328. The information can include, e.g., an IP address and port of the virtual machine 328, preferred transport protocol (e.g. TCP or UDP), zone (location), fully qualified application path and executable module name, so it can later be executed at the machine hosting the requested resource, etc. The broker server 320, in turn, passes the information to the workspace server 315.

Using the information, the workspace server 315 generates a connection description file that includes all required instructions for establishing the computing session for the requested resource and information (e.g., the data file-path) for accessing the data file stored by the remote storage provider 321. The connection description file may also include gateway addresses that can be used for establishing the computing session remotely via a gateway. The workspace server 315 may determine the gateway addresses based on the zone (location) of the resolved virtual machine 328. In embodiments, the gateways could be similar to appliance 108 of FIG. 1. In embodiments, the connection description file can be an independent computer architecture (ICA) file that is used by the client device 305 to establish the computing session according to Citrix's ICA protocol as discussed in greater detail with respect to FIGS. 8-10. The workspace server 315 sends the connection description file to the client device 305.

Using the connection description file, a computing session engine 313 hosted by the virtualization client 310 on the client device 305 initiates the computing session for the requested resource. For example, the computing session engine 313 extracts from the connection description file the IP address and port of the virtual machine 328 to establish a direct computing session with the virtual machine 328 via network 302. As another example, the computing session engine 313 extracts from the connection description file a gateway address to establish a remote computing session with the virtual machine 328 via a gateway (not shown in FIG. 3). In an embodiment, the gateway could be similar to appliance 108 of FIG. 1. In an embodiment, the computing session engine 313 can send a connection request to the virtual machine 328 using the extracted IP address and port of the virtual machine 328, preferred transport, etc. In response to receiving the connection request, the virtual machine 328 can establish a data session with the remote storage provider 321 for the data file using the cached remote storage session handle as described in greater detail with respect to FIG. 10.

Figure 4:
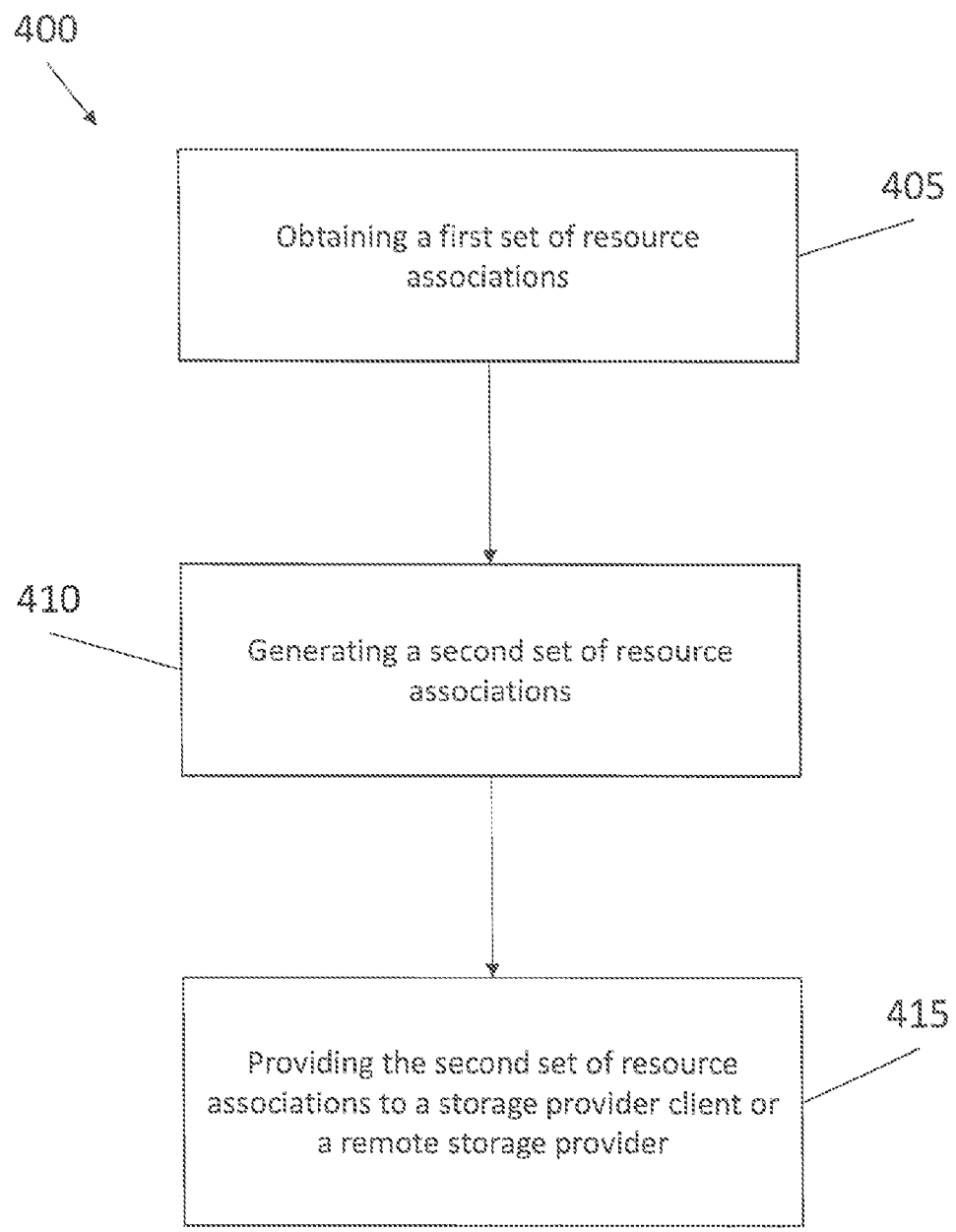
FIG. 4 is a flow diagram of an illustrative method for enumerating file type associations of applications hosted by a server in accordance with one or more illustrative aspects of the concepts described herein.

Regarding FIG. 4, a method 400 is directed to generating data file-type associations that enable one or more apps stored by a virtualization server to execute one or more files stored by or accessible from a remote storage provider (e.g., the virtualization server 324 and the remote storage provider 321, respectively, of FIG. 3).

In a first example, the method 400 is performed by a workspace client (e.g., the workspace client 311 of FIG. 3). At 405, the method includes obtaining, by the workspace client, a first set of resource associations from a workspace server (e.g., the workspace server 315 of FIG. 3). The resources may be obtained, for example, by a Workspace server communicating with a broker server, with the broker server subsequently enumerating published resources. The first list of resource associations, (e.g. FTAs) could be obtained by querying installed application metadata, e.g. using Shell integration APIs, or reading registry configurations. The first list of resource associations could also be explicitly configured or overridden by an administrator (e.g. an administrator may override default application FTAs). The first list of resource associations may then be returned by the broker server as metadata for the enumerated published resources.

The first set of resource associations can be a first set of resource associations that identifies the data file-types executable by a resource of a plurality of resources (e.g., the resources 327 of FIG. 3). At 410, the method 400 includes generating, by the workspace client, from the first set of resource associations, a second set of resource associations. The second set of resource associations can be a second set of resource associations that identifies a subset of the resources that can execute the data file-types.

The second set of resource associations may be generated, using a variety of different techniques. For example, the second set of resource associations may be generated by prioritizing the list of applications that handle a single file. Also, the second set of resource associations may be generated by using a user's favorites and recently used applications list to determine a priority order. Or a Workspace server could request a service (e.g. the Citrix Analytics Service (CAS)) to obtain recently/frequently used applications with specific file types. Information may be collected by CWA and/or virtualization server and provided to the CAS. Or an application could be pinned as a default app to open a file, e.g. based on a favorite application. Or a user simply clicks on file and opens it with a default application or a first application in priority order. Or a user could simply right-click to receive a menu from which to choose the second set of resource associations.

The method 400, at 415, also includes providing the second set of resource associations to a storage provider client (e.g., the storage provider client 312 of FIG. 3).

In a second example, the method 400 can be performed by a workspace server (e.g., the workspace server 315 of FIG. 3). Accordingly, at 405, the method includes obtaining, by the workspace server, a first set of resource associations from a broker server (e.g., the broker server 320 of FIG. 3). At 410, the method 400 includes generating, by the workspace server, a second set of resource associations using the first set of resource associations. The method 400, at 415, also includes providing the second set of resource associations to a storage provider (e.g., the remote storage provider 321 of FIG. 3).

Figure 5:
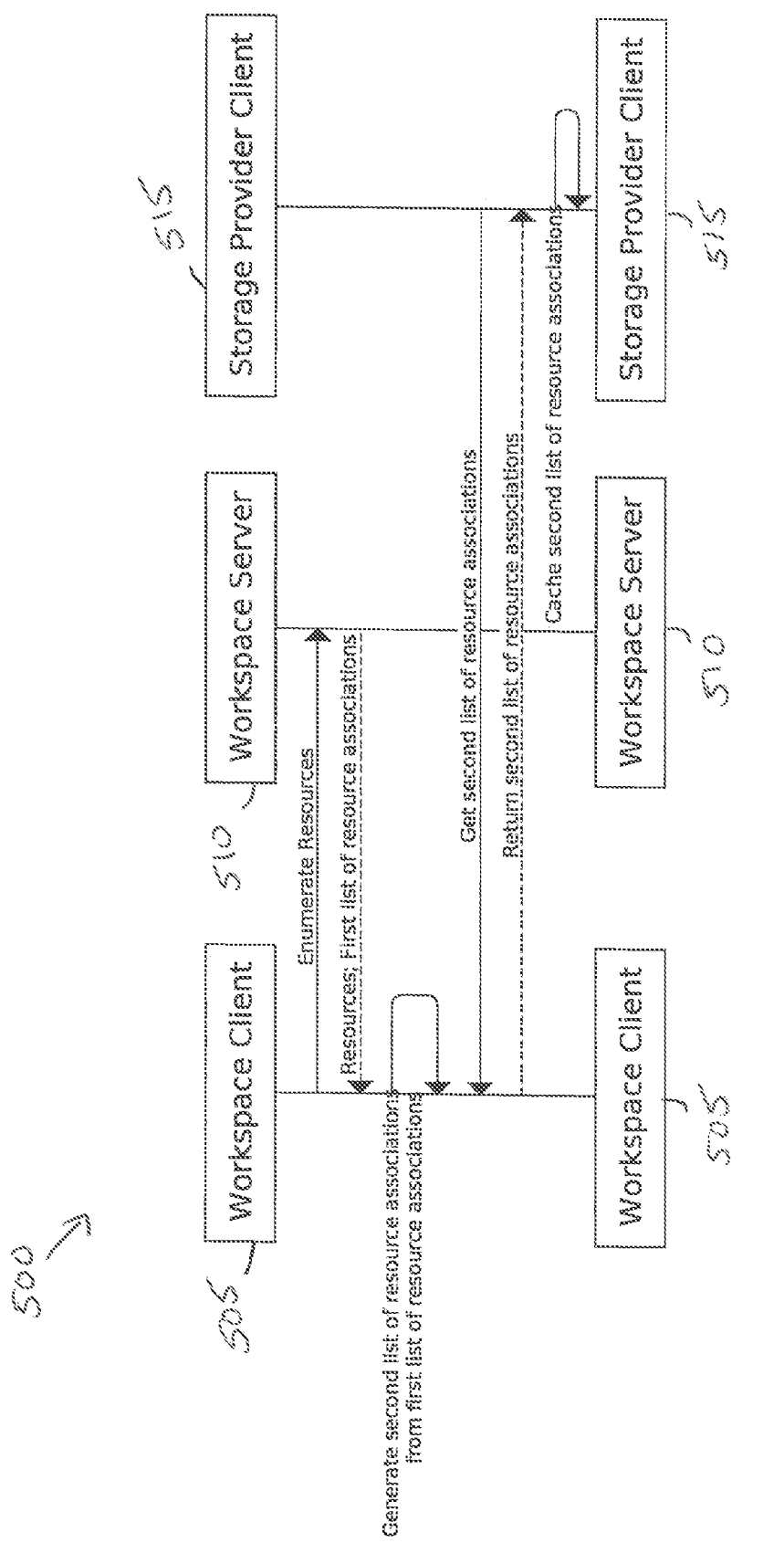
FIG. 5 is an illustrative process flow for enumerating file type associations of applications hosted by a server in accordance with one or more illustrative aspects of the concepts described herein.

Regarding FIG. 5, a process flow 500 that relates to generating, by a workspace client 505, data file-type associations that enable one or more apps stored by a virtualization server to execute one or more files stored by or accessible from a remote storage provider (e.g., the virtualization server 324 and the remote storage provider 321, respectively, of FIG. 3). The workspace client 505 can be substantially similar to the workspace client 311 of FIG. 3. The workspace client 505 retrieves a first set of resource associations that identifies the data file-types each of the resources (e.g., resources 327 of FIG. 3) can execute from a workspace server 510, which can be substantially similar to the workspace server 315 of FIG. 3. In embodiments, the workspace client 505 retrieves the first set of resource associations by sending an enumerate resources request to the workspace server 510. For example, the workspace server 510 receives the enumerate resources request and forwards it to the broker server (not shown, e.g. broker server 320 of FIG. 3). The broker server 320 then responds to the request by reading stored first set of resource associations that identifies the data file-types executable by a resource of a plurality of resources (e.g., the resources 327 of FIG. 3). The first list of resource associations (e.g. FTAs) could be obtained using one of the techniques described above. As also noted above, the first list of resource associations may then be returned by the broker server as metadata for the enumerated published resources.

Using the first set of resource associations, the workspace client 505 generates a second set of resource associations that identifies a subset of the resources that can execute each data file-type. For example, the workspace client 505 can extract a list of file type associations (FTAs) for each of the resources from the first set of resource associations and reorganize the list to identify a list of resources that can execute each data file-type. A storage provider client 515 (e.g., such as the storage provider client 312 of FIG. 3) obtains the second set of resource associations from the workspace client 505.

Figure 6:
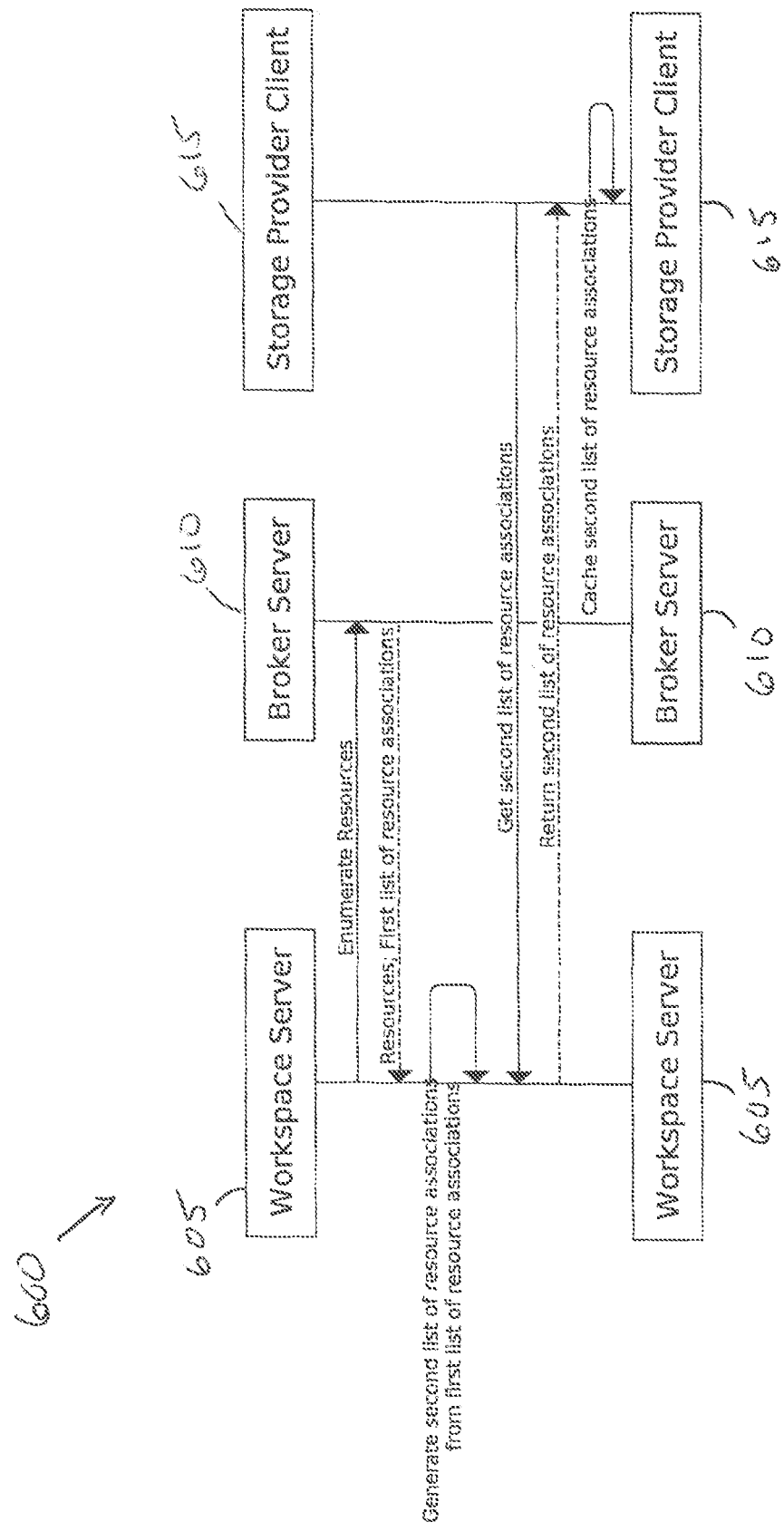
FIG. 6 is another illustrative process flow for enumerating file type associations of applications hosted by a server in accordance with one or more illustrative aspects of the concepts described herein.

Regarding FIG. 6, a process flow 600 relates to generating, by a workspace server 605, data file-type associations that enable one or more apps stored by a virtualization server to execute one or more files stored by or accessible from a remote storage provider (e.g., the virtualization server 324 and the remote storage provider 321, respectively, of FIG. 3). The workspace server 605 can be substantially similar to the workspace server 315 of FIG. 3. The workspace server 605 retrieves a first set of resource associations that identifies the data file-types executable by the resources (e.g., resources 327 of FIG. 3) from a broker server 610, which can be substantially similar to the broker server 320 of FIG. 3. In embodiments, the workspace server 605 retrieves the first set of resource associations by sending an enumerate resources request to the broker server 610. Using the first set of resource associations, the workspace server 605 generates a second set of resource associations that identifies a set of the resources that can execute each data file-type. A storage provider client 615 (e.g., such as a client of the remote storage provider 321 of FIG. 3) obtains the second set of resource associations from the workspace sever 605. In further embodiments, the storage provider client 615 can store the second set of resource associations in a cache of the workspace server 605. The storage provider client can also clear the cache in response to a termination of the computing session with the broker server 610.

Figure 7:
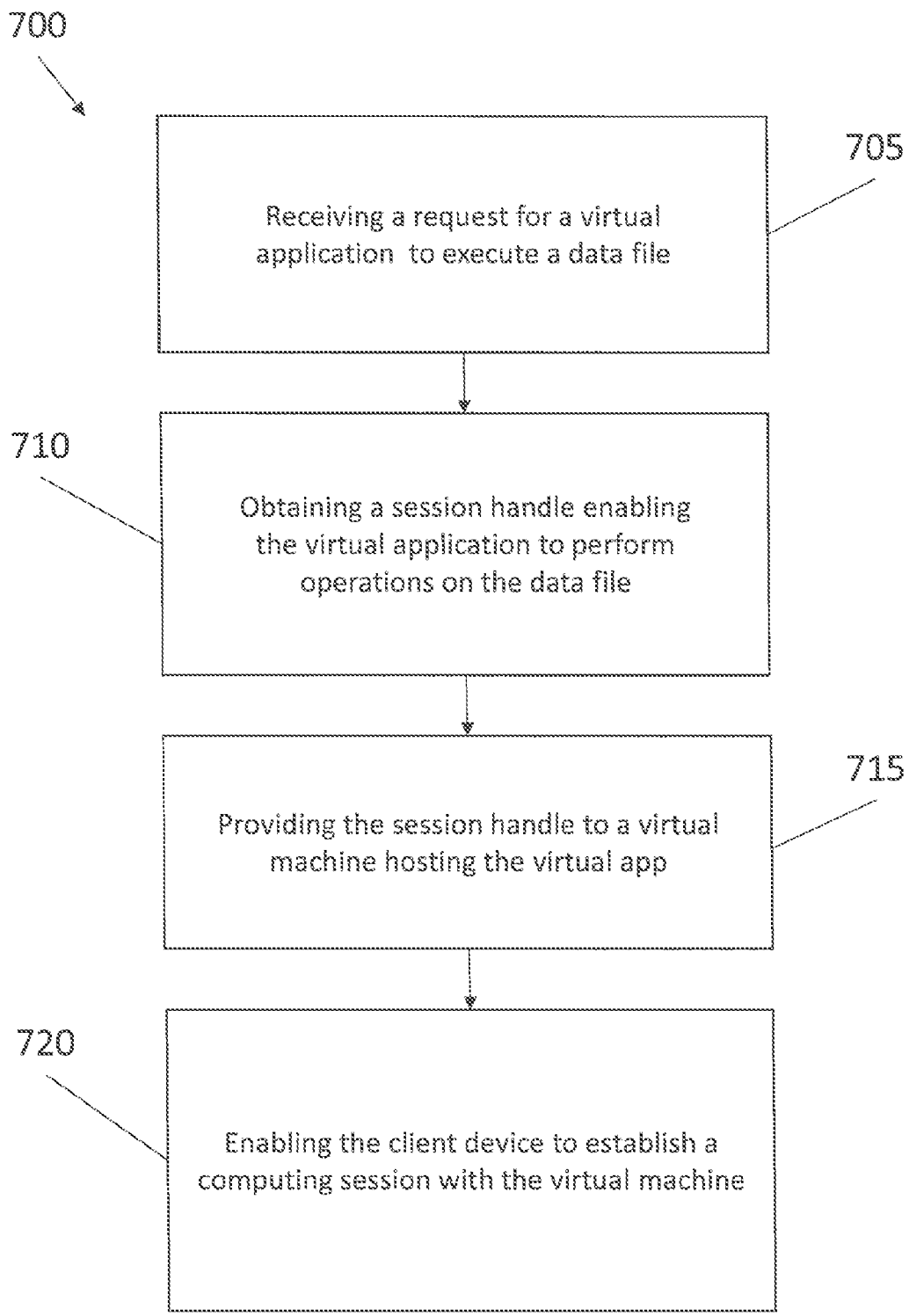
FIG. 7 is a flow diagram of an illustrative method that relates to accessing and/or operating on files stored in remote storage using a virtual application in accordance with one or more illustrative aspects of the concepts described herein.

Regarding FIG. 7, a method 700 relates to accessing and/or operating on files stored in or accessible from remote storage provider using a virtual application as can be performed by a workspace server such as the workspace server 315 of FIG. 3. At 705, the method 700 includes receiving a request from a user of a client device for a virtual application ("app") to execute a data file stored by or accessible from a remote storage provider (e.g., the client device 305 and the remote storage provider 321, respectively, of FIG. 3). In embodiments, the virtual app can be one of the resources 327 of FIG. 3.

The method 700, at 710, also includes obtaining from the remote storage provider a session handle that enables the virtual app to perform user operations on the data file. In an example, obtaining the session handle can include retrieving an authorization token from an authentication platform (e.g., authentication platform 318 of FIG. 3). Additionally, the method 700, at 715, includes providing the session handle to a virtual machine (e.g., the virtual machine 328 of FIG. 3) hosting the virtual app according to any one of the techniques described in FIGS. 3 & 8-9. Further, the method 700, at 720, includes enabling the client device to establish a computing session with the virtual machine for the virtual app to perform the user operations on the data file according any one of the techniques described in FIGS. 3 and 8-10.

Regarding FIG. 8, an example process flow 800 relates to accessing and/or operating on files stored in or accessible through a remote storage using a virtual application. The process begins with a user of a client device 801 selecting a cloud-stored file using a virtual app delivered to the user by a virtual delivery agent ("VDA") 845 that can be executed by a virtual machine hosted by virtualization server (e.g., the virtual machine 328 and the virtualization server 324, respectively, of FIG. 3). The cloud-stored file can be stored in a remote storage by a remote storage provider 835 (e.g., the remote storage 322 and the remote storage provider 321, respectively, of FIG. 3). A storage provider client 810 can present selectable icons representing the cloud-stored files on a touchscreen of the client device 801. In this illustrative example, the storage provider client 810 may be provided as Citrix's ShareFile UI Plugin, but a skilled artisan understands that it can also be substantially similar to the storage provider client 312 of FIG. 3. The storage provider client 810 can present the icons to the user in a manner that indicates a data-file type of the cloud-stored file and/or one or more virtual apps operable to execute the cloud-stored file. Accordingly, the user can either select a default virtual app or a user-preferred virtual app to execute the cloud-stored file. Thus, in response to the user's selection, the storage provider client 810 sends a launch signal (or launch protocol) to a workspace client 815 on the client device 801 that includes, e.g., an application ID and a file-path to the location of the cloud-stored file. In this example, the workspace client 815 is represented as Citrix's Receiver for Web JavaScript (JS) but can also be substantially similar to the workspace client 311 of FIG. 3). The workspace client 815 sends the launch protocol to a workspace server 802, which can be substantially similar to the workspace server 315 of FIG. 3.

In this illustrative example, the workspace server 802 includes Citrix's StoreFront Web Application Programming Interface (API) 820, but a skilled artisan understands that any web API configured to accept, service or proxy requests from web-based applications can be used. Additionally, in this illustrative example, the workspace server 802 includes a store service 825, i.e., Citrix's Store Service, but a skilled artisan understands that any resources manager configured to control access to one or more resources (e.g., the resources 327 of FIG. 3) can be implemented. In the illustrated example, the StoreFront Web API 820, a.k.a. Receiver for Web Proxy API, calls into Store Services API provided by the store service 825, but a skilled artisan understands that any other API combinations are possible, including for example, the StoreFront Web API 820 substantially subsuming the functions of the Store Services API.

The Storefront Web API 820 receives the launch signal (or launch protocol) and passes it to the store service 825. Upon receiving the launch signal (or launch protocol), the store service 825 issues a request to an authentication platform 830 for a remote storage authentication token. The authentication platform 830 is represented as Citrix's Delivery Services (DS) Auth Service but can also be substantially similar to the authentication platform 318 of FIG. 3. The request can include the user's authentication credentials (e.g., user name and password) and a resource identifier of the virtual app. In an embodiment, the resource identifier can be a string of unique alphanumeric characters, or any other unique code, that can identify a specific resource. For example, the alphanumeric string "A001" can identify an application, e.g., Microsoft Word delivered by the VDA 845. The authentication server 830 can verify the user's authentication credentials by performing a look-up of, e.g., a look-up table, database or other structure that identifies the user identity. Upon successful authentication, the authentication server 830 can return to the store service 825 a primary authentication token, which provides authorization and defines the user's resource type entitlements. In other embodiments, a primary authentication token may be directly provided by the Receiver for Web JS 815 to the store service 825 based on prior authentication. Based on the verified user identity, the store service 825 can then determine the resource types the user is authorized to access, e.g. published virtual applications and desktops, cloud-stored files, etc. Once the user is determined to have access to files stored by the remote storage provider 835, the store service 825 may use the primary authentication token to request from the authentication platform 830 a secondary (or delegated) authentication token for accessing the remote storage provider 835. In this example, the secondary authentication token may be referred to as remote storage authentication token. The authentication platform 830 may return the remote storage authentication token to the store service 825.

Using the remote storage authentication token, the store service 825 sends a remote storage session handle ("session handle") request to the remote storage provider 835. In this example, the remote storage provider 835 is represented as Citrix's ShareFile Resource Provider, but a skilled artisan understands that the remote storage provider 835 can be substantially similar to the remote storage provider 321 of FIG. 3. The session handle request can include the remote storage authentication token.

Upon receiving the session handle request, the remote storage provider 835, sends the session handle to the store service 825. In response to receiving the session handle, the store service 825 sends a request to a broker 840 (e.g., the broker server 320 of FIG. 3) for an address of the virtual app that includes the session handle. A broker 840 may be responsible for aggregating, managing, and monitoring a plurality of VDA 845 instances. A broker 840 may be further responsible for resolving an address of the virtual app by first determining a suitable set of VDA 845 instances where the virtual app is installed and published and then load-balancing to a single (resolved) VDA 845 instance based on various additional criteria such as a VDA 845 being currently available or least loaded compared to all other VDA 845 instances.

Responsive to receiving the request, the broker 840 resolves a name (e.g., an application name) of the virtual app as described above with respect to FIG. 3. Additionally, the broker 840 sends a command to the VDA 845 to prepare for a computing session with the client device 801 for the virtual app. In embodiments, the command can include the session handle.

In response to receiving the command, the VDA 845 caches the session handle and returns, to the broker 840, information required to establish the computing session between the client device 801 and the VDA 845. The information can include, e.g., an IP address and port of the virtual machine hosting the VDA 845 and configured to host the virtual app as described above with respect to FIG. 3. The broker 840, in turn, passes the information to the store service 825.

Using the information, the store service 825 generates a connection description file that includes instructions for establishing the computing session for the requested resource and information (e.g., the data file-path) for accessing the data file stored by the remote storage provider 835. In embodiments, the connection description file can be an independent computer architecture (ICA) file that is used by a computing session engine (e.g., Citrix's HDX engine 805 or the computing session engine 313 of FIG. 3) of the client device 801 to establish the computing session according to Citrix's ICA protocol as discussed in greater detail with respect to FIG. 10. The store service 825 sends the connection description file to the HDX engine 805 via the StoreFront Web API 820 and the Receiver for Web JS 815.

With the connection description file, the HDX engine 805 initiates the computing session for the virtual app to execute the cloud-stored file by sending a launch connection protocol to the VDA 845. The VDA 845 receives the launch connection protocol and established a computing session (e.g. a virtual computing session) for the client device 801 to access the virtual app. Additionally, the VDA initiates a data session with the remote storage provider 835 to enable the user of the virtual app to perform operations on the cloud-stored file as described in greater detail with respect to FIG. 10.

Regarding FIG. 9, an example process flow 900 relates to accessing and/or operating on files stored in remote storage using a virtual application and begins with a user of a client device 901 selecting a cloud-stored file using a virtual app delivered to the user by a virtual delivery agent ("VDA") 945 that can be executed by a virtual machine hosted by a virtualization server (e.g., the virtual machine 328 and the virtualization server 324, respectively, of FIG. 3). The cloud-stored file can be stored in a remote storage by a remote storage provider 935 (e.g., the remote storage 322 and the remote storage provider 321, respectively, of FIG. 3). A storage provider client 910 can present selectable icons representing the cloud-stored files on a touchscreen of the client device 901. In this specific example, the storage provider client 910 is represented as Citrix's ShareFile UI Plugin, but a skilled artisan understands that it can also be substantially similar to the storage provider client 312 of FIG. 3. The storage provider client 910 can present the icons to the user in a manner that indicates a data-file type of the cloud-stored file and/or one or more virtual apps operable to execute the cloud-stored file. Accordingly, the user can either select a default virtual app or a user-preferred virtual app to execute the cloud-stored file. Thus, in response to the user's selection, the storage provider client 312 sends a launch signal (or launch protocol) to a workspace client that includes a receiver for Web JS 915 and a native receiver 920. The launch signal (or launch protocol) includes, e.g., an application ID and a file-path location of the cloud-stored file. The workspace client can be substantially similar to the workspace client 311 of FIG. 3. The workspace client (native receiver 920) sends the launch signal (or launch protocol) to a workspace server (store service 925), which can be substantially similar to the workspace server 315 of FIG. 3. In this illustrative example, the workspace server 925 is represented as Citrix's Store Service, but a skilled artisan understands that any resources manager configured to control access to one or more resources (e.g., the resources 327 of FIG. 3) can be implemented.

Upon receiving the request, the workspace server 925 issues a request to an authentication platform 930 for a remote storage authentication token. The authentication platform 930 is represented as Citrix's Delivery Services (DS) Auth Service but can also be substantially similar to the authentication platform 318 of FIG. 3. The request can include the user's authentication credentials (e.g., user name and password) and a resource identifier of the virtual app. In an embodiment, the resource identifier can be a string of unique alphanumeric characters, or any other unique code, that can identify a specific resource. For example, the alphanumeric string "A001" can identify an application, e.g., Microsoft Word delivered by the VDA 945. The authentication platform 930 can verify the user's authentication credentials by performing a look-up of, e.g., a look-up table, database or other structure that identifies the user identity. Upon successful authentication, the authentication server 930 can return to the workspace server 925 a primary authentication token, which provides authorization and defines the user's resource type entitlements. In other embodiments, a primary authentication token may be directly provided by the Receiver for Web JS 915 to the workspace server 925 based on prior authentication. Based on the verified user identity, the workspace server 925 can then determine the resource types the user is authorized to access, e.g. published virtual applications and desktops, cloud-stored files, etc. Once the user is determined to have access to files stored by the remote storage provider 935, the workspace server 925 may use the primary authentication token to request from the authentication platform 930 a secondary (or delegated) authentication token for accessing the remote storage provider 935. In this example, the secondary authentication token may be referred to as remote storage authentication token. The authentication platform 930 may return the remote storage authentication token to the workspace server 925.

Using the remote storage authentication token, the workspace server 925 sends a remote storage session handle ("session handle") request to the remote storage provider 935. In this example, the remote storage provider 935 is represented as Citrix's ShareFile Resource Provider, but a skilled artisan understands that the remote storage provider 935 can be substantially similar to the remote storage provider 321 of FIG. 3. The session handle request can include the remote storage authentication token.

Upon receiving the session handle request, the remote storage provider 935 sends the session handle to the workspace server 925. In response to receiving the session handle, the workspace server 925 sends a request to a broker 940 (e.g., the broker server 320 of FIG. 3) for an address of the virtual app that includes the session handle. A broker 940 may be responsible for aggregating, managing, and monitoring a plurality of VDA 945 instances. A broker 940 may be further responsible for resolving an address of the virtual app by first determining a suitable set of VDA 945 instances where the virtual app is installed and published and then load-balancing to a single (resolved) VDA 945 instance based on various additional criteria such as a VDA 945 being currently available or least loaded compared to all other VDA 945 instances.

Responsive to receiving the request, the broker 940 resolves a name (e.g., an application name) of the virtual app as described above with respect to FIG. 3. Additionally, the broker 940 sends a command to the VDA 945 to prepare for a computing session with the client device 901 for the virtual app. In embodiments, the command can include the session handle.

In response to receiving the command, the VDA 945 caches the session handle and returns, to the broker 940, information required to establish the computing session between the client device 901 and the VDA 945. The information can include, e.g., an IP address and port of the virtual machine hosting the VDA 945 and configured to host the virtual app as described above with respect to FIG. 3. The broker 940, in turn, passes the information to the workspace server 925.

Using the information, the workspace server 925 generates a connection description file that includes instructions for establishing the computing session for the requested resource and information (e.g., the data file-path) for accessing the data file stored by the remote storage provider 935. In embodiments, the connection description file can be an independent computer architecture (ICA) file that is used by a computing session engine (e.g., Citrix's HDX engine 905 or the computing session engine 313 of FIG. 3) of the client device 901 to establish the computing session according to Citrix's ICA protocol as discussed in greater detail with respect to FIG. 10. The workspace server 925 sends the connection description file to the HDX engine 905 via the native receiver 920.

With the connection description file, the HDX engine 905 initiates the computing session for the virtual app to execute the cloud-stored file by sending a launch connection protocol to the VDA 945. The VDA 945 receives the launch connection protocol and established a computing session (e.g. a virtual computing session) for the client device 901 to access the virtual app. Additionally, the VDA initiates a data session with the remote storage provider 935 to enable the user of the virtual app to perform operations on the cloud-stored file as described in greater detail with respect to FIG. 10.

Figure 10:
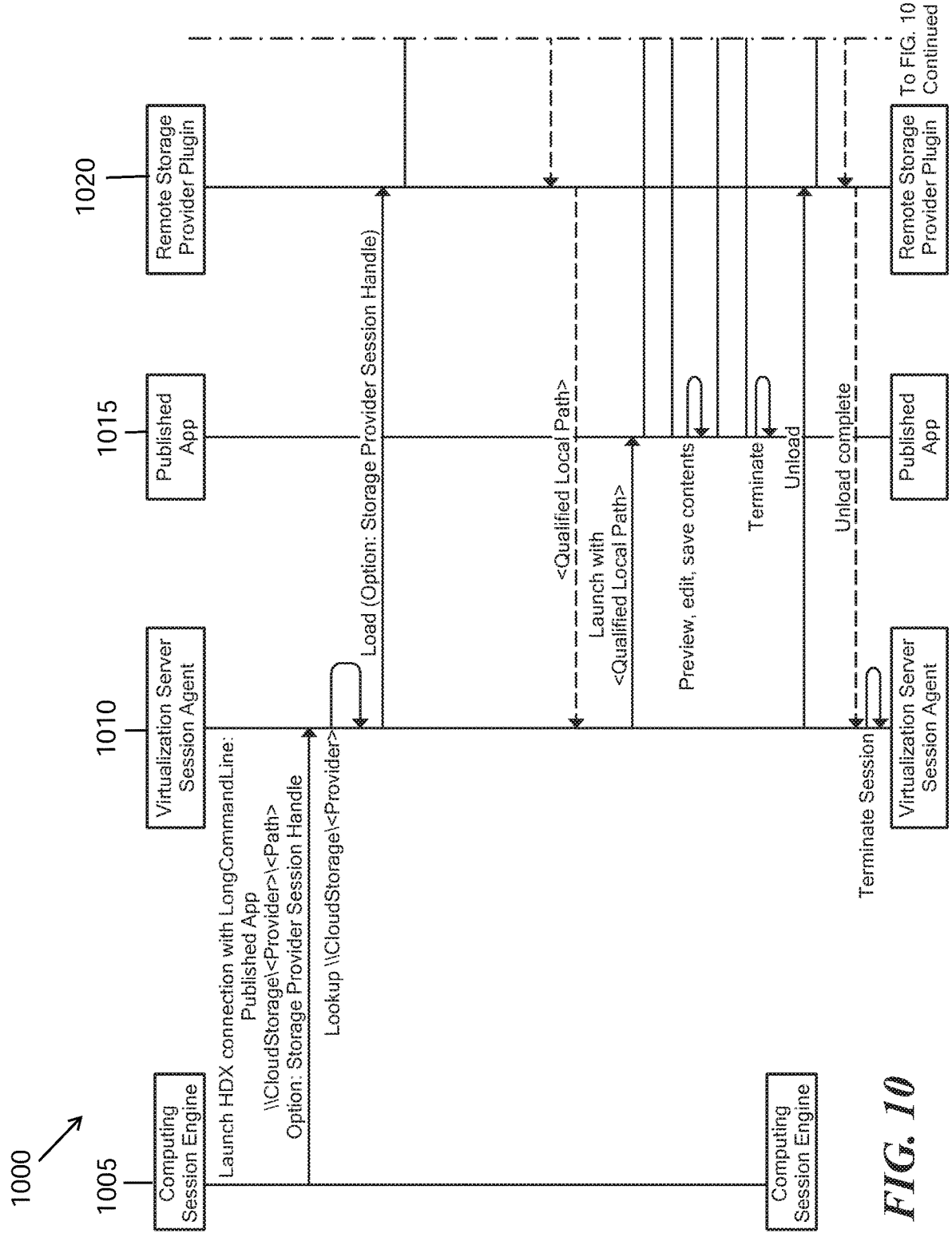
FIG. 10 is an illustrative process flow for launching a virtual computing session in accordance with one or more illustrative aspects of the concepts described herein.
Figure 10:
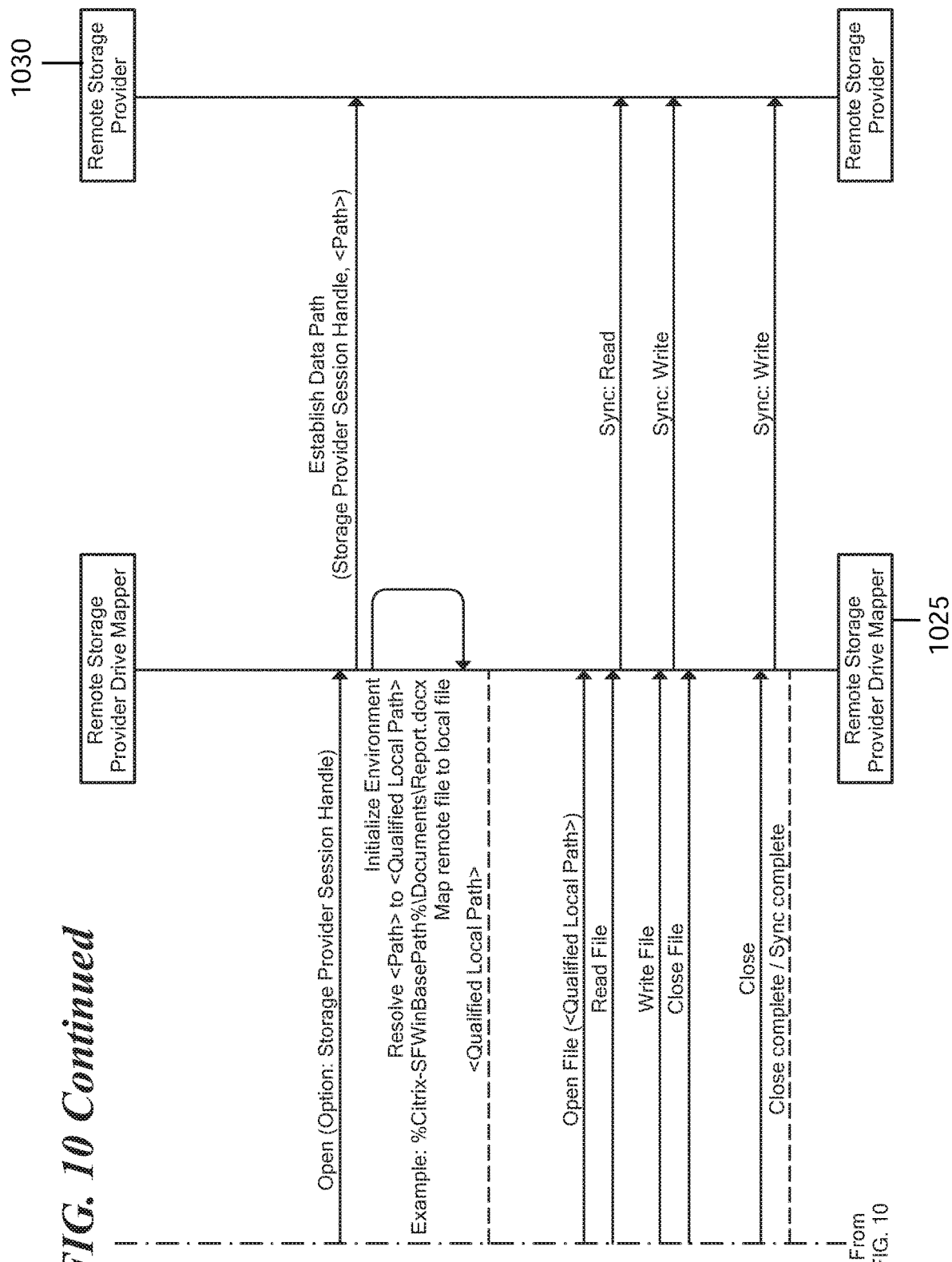

Regarding FIG. 10, a detailed process flow 1000 begins with a computing session engine ("engine") 1005 (e.g., the HDX engines 805, 905 and the computing session engine 313 of FIG. 3) initiating a computing session for a published virtual app ("app") 1015 to execute a cloud-stored file by a remote storage provider ("storage provider") 1030. In embodiments, the engine 1005 is executed by a client device (e.g., client device 305 of FIG. 5) and the app 1015 is delivered to the client device by a virtualization server session agent ("session agent") 1010. The session agent 1010 can be substantially similar to the VDAs 845, 945 of FIGS. 8 & 9, respectively. Accordingly, the session agent 1010 can be executed by a virtualization server such as the server 324 of FIG. 3.

The engine 1005, using a connection description file (e.g., ICA file) as describe above in FIGS. 8-9, initiates the computing session by sending a launch connection ("LC") protocol to the session agent 1010. The LC protocol can include information identifying the app 1015 (e.g., application ID, address, and/or name), and a file-path to a location of the cloud-stored file. In some embodiments, the LC protocol can also include a session handle such as the session handle described with respect to FIGS. 3, 8, & 9. For example, the LC protocol can include the session handle in embodiments where the session agent 1010 does not cache the session handle as described above in FIGS. 3, 8, & 9.

In response to receiving the LC protocol, the session agent 1010 identifies the storage provider associated with the cloud-stored file. In embodiments, the session agent 1010 can identify the storage provider by searching a table or other data structure that associates file-paths with storage providers. Upon identifying the storage provider, the session agent 1010 sends load information to a remote storage provider plugin ("plugin") 1020 that corresponds to the identified storage provider (e.g., the remote storage provider plugin 325 of FIG. 3). In embodiments, session agent 1010 may utilize a load protocol which comprises a storage provider session handle option.

The plugin 1020 can be installed on the virtualization server to provide the session agent 1010 an interface with the storage provider 1030. The load signal includes the file-path of the cloud-stored file and can also include the session handle. Accordingly, the plugin 1020 uses the load signal to establish a data session (e.g., a data path) from the session agent to the storage provider 1030. In embodiments, the plugin 1020 can provide the load signal to a remote storage provider drive mapper ("drive mapper") 1025, which established the data session (e.g., the remote storage provider drive mapper 326 of FIG. 3). The drive mapper 1025 can also be installed on the virtualization server and provides the session agent 1010 with a local resource to manage and update the cloud-stored file based on operations a user performs to the cloud-stored file via the virtual app. In embodiments, the plugin 1020 or the drive mapper 1025 sends a data path protocol that includes the session handle to the storage provider 1030. In some embodiments, after receiving the session handle the storage provider 1030 queries data associated with the session handle, e.g. decrypts a data blob contained by or pointed to by the session handle. The decrypted data blob may contain information identifying customer ID, user ID, user virtual (e.g. highly available, distributed, replicated, etc.) folder or a set of virtual folders, access permissions (e.g. read and/or write), issue date and time, expiration date and time, and any additional access control or telemetry information that may be necessary for securely establishing a data session with the remote storage provider 1030 on behalf of the authenticated user. Upon establishing that the session handle is valid, the storage provider 1030 completes the establishment of the data session by mapping it to the authenticated user's virtual folder in cloud storage.

The drive mapper 1025 initializes a local environment to enable the virtual app to perform operations on the cloud-stored file. For example, the drive mapper 1025 establishes a local copy of the cloud-stored file and maps a local-file (i.e., a path to the copy) to the file-path to the remote location of the cloud-stored file. In embodiments, the drive mapper 1025 generates a table or other data structure that maps the local-file-path to the copy to the file-path of a remote location of the cloud-stored file.

Once the data session is established, the drive mapper 1025 provides the local-file-path to the session agent 1010 via the plugin 1020. The session agent 1010 issues a launch signal to the app 1015 that includes the local-file-path to the copy. Accordingly, the app 1015 opens the local file by sending an open file signal with the local file-path to the drive mapper 1025. Once the copy is opened, the app 1015 can perform read/write/save operations on the copy based on input from the user of the app 1015. The app 1015 sends each read/write operation to the drive mapper 1025 which in turn issues read/write/save synchronization signals to the storage provider 1030. The storage provider 1030 then updates the cloud-stored file using the synchronization signal. For example, the synchronization signal can include the read/write/save operations along with the file-path of the cloud-stored file.

In response to receiving a termination signal (e.g., close file) from the user, the app 1015 can issue a close signal to the drive mapper 1025. Additionally, upon the user closing the app 1015 the computing session may be terminated. In response to the app 1015 closing and/or pending termination of the computing session, the session agent 1010 can issue an unload signal to the plugin 1020, which then issues a close signal to the drive mapper 1025.

In response to receiving the close signal, the drive mapper 1025, issues a write synchronization signal to the storage provider 1030. Accordingly, the storage provider 1030 performs synchronization of the cloud-stored file with the copy. Thus, the write synchronization signal is used to ensure that the cloud-stored file includes all read/write/save operations of the copy before a computing session with the app is terminated. Once the synchronization is complete, the drive mapper 1025 sends a close complete signal to the plugin 1020, which advises, via an unload complete signal, the session agent 1010 that it can terminate the computing session.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the embodiments described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A method comprising:
retrieving, by a workspace client on a computing device, a first set of resource associations from a workspace server, the first set of resource associations identifying one or more data file-types executable by each application on a virtualization server;
generating, by the workspace client, from the first set of resource associations, a second set of resource associations, the second set of resource associations identifying a subset of applications on the virtualization server operable to perform operations on each of the one or more data file-types; and
obtaining, by a storage provider client on the computing device, the second set of resource associations, wherein the storage provider client is configured to identify, from the second set of resource associations, one or more applications on the virtualization server operable to perform operations on at least one data file and to enable the one or more applications on the virtualization server to execute the at least one data file accessible from a storage provider by establishing a direct connection between the computing device and the one or more applications on the virtualization server.

2. The method of claim 1, further comprising:
establishing, by the workspace client, a computing session with the workspace server; and
wherein the workspace client retrieves applications on the virtualization server that are authorized for access by a user of the computing device.

3. The method of claim 2, further comprising:
storing, by the storage provider client, the second set of resource associations in a cache of the computing device; and
clearing, by the storage provider client, the cache in response to a termination of the computing session with the workspace server.

4. The method of claim 1, wherein the storage provider is a remote storage provider.

5. A method comprising:
retrieving, by a workspace server, a first set of resource associations from a broker server, the first set of resource associations identifying one or more data file-types executable by each application on a virtualization server;
generating, by the workspace server, from the first set of resource associations, a second set of resource associations, the second set of resource associations identifying a subset of applications on the virtualization server operable to perform operations on each of the one or more data file-types; and
obtaining, by a storage provider client on the workspace server, the second set of resource associations, wherein the storage provider client is configured to identify, from the second set of resource associations, one or more applications on the virtualization server operable to perform operations on at least one data file and to enable the one or more applications on the virtualization server to execute the at least one data file accessible from a storage provider using a session handle obtained from the storage provider.

6. The method of claim 5, further comprising:
establishing, by the workspace server, a computing session with the broker server; and
wherein the workspace server retrieves applications on the virtualization server that are authorized for access by a user of a computing device in communication with the workspace server.

7. The method of claim 6, further comprising:
storing, by the storage provider client, the second set of resource associations in a cache of the workspace server; and
clearing, by the storage provider client, the cache in response to a termination of the computing session with the broker server.

8. The method of claim 5, wherein the storage provider is a remote storage provider.

9. A non-transitory computer-readable medium comprising computer-executable instructions, which when executed by one or more processors, cause the one or more processors to:
retrieve a first set of resource associations from a workspace server, the first set of resource associations identifying one or more data file-types executable by each application on a virtualization server;
generate a second set of resource associations, the second set of resource associations identifying a subset of applications on the virtualization server operable to perform operations on each of the one or more data file-types;
identify, from the second set of resource associations, one or more applications on the virtualization server operable to perform operations on at least one data file;
initiate launch of the one or more applications on the virtualization server to execute the at least one data file accessible from a storage provider; and
establish a direct connection to the one or more applications on the virtualization server.

10. The non-transitory computer-readable medium of claim 9, further comprising computer-executable instructions that, when executed, cause the one or more processors to:
establish a computing session with the workspace server; and
retrieve applications on the virtualization server that are authorized for access by a user of a computing device.

11. The non-transitory computer-readable medium of claim 10, further comprising computer-executable instructions that, when executed, cause the one or more processors to:
store the second set of resource associations in a cache; and
clear the cache in response to a termination of the computing session with the workspace server.

12. The non-transitory computer-readable medium of claim 9, wherein the storage provider is a remote storage provider.

13. A non-transitory computer-readable medium comprising computer-executable instructions, which when executed by one or more processors, cause the one or more processors to:
retrieve a first set of resource associations from a broker server, the first set of resource associations identifying one or more data file-types executable by each application on a virtualization server;
generate a second set of resource associations, the second set of resource associations identifying a subset of applications on the virtualization server operable to perform operations on each of the one or more data file-types;

identify, from the second set of resource associations, one or more applications on the virtualization server operable to perform operations on at least one data file; and initiate launch of the one or more applications on the virtualization server to execute the at least one data file accessible from a storage provider using a session handle obtained from the storage provider.

14. A device comprising:

a memory;

one or more processors coupled to the memory, the one or more processors configured to:

retrieve, using a workspace client stored in the memory, a first set of resource associations from a workspace server, the first set of resource associations identifying one or more data file-types executable by each application on a virtualization server;

generate, using the workspace client, a second set of resource associations, the second set of resource associations identifying a subset of applications on the virtualization server operable to perform operations on each of the one or more data file-types; and obtain, using a storage provider client stored in the memory, the second set of resource associations, wherein the storage provider client is configured to identify, from the second set of resource associations, one or more applications on the virtualization server operable to perform operations on at least one data file and to enable the one or more applications on the virtualization server to execute the at least one data file accessible from a storage provider by establishing a direct connection between the computing device and the one or more applications on the virtualization server.

15. The device of claim 14, wherein the one or more processors are further configured to:

establish, using the workspace client, a computing session with the workspace server; and retrieve, using the workspace client, applications on the virtualization server that are authorized for access by a user of a computing device.

16. The device of claim 15, wherein the one or more processors are further configured to:

store, using the storage provider client, the second set of resource associations in a cache coupled to the one or more processors; and clear, using the storage provider client, the cache in response to a termination of the computing session with the workspace server.

17. The device of claim 14, wherein the storage provider is a remote storage provider.

18. A server comprising:

a memory;

one or more processors coupled to the memory, the one or more processors configured to:

retrieve a first set of resource associations from a broker server, the first set of resource associations identifying one or more data file-types executable by each application on a virtualization server;

generate a second set of resource associations, the second set of resource associations identifying a subset of applications on the virtualization server operable to perform operations on each of the one or more data file-types; and identify, from the second set of resource associations, one or more applications on the virtualization server operable to perform operations on at least one data file; and initiate launch of the one or more applications on the virtualization server to execute the at least one data file accessible from a storage provider using a session handle obtained from the storage provider.

19. The server of claim 18, wherein the one or more processors are further configured to:

establish a computing session with the broker server; and retrieve applications on the virtualization server that are authorized for access by a user of a computing device in communication with the virtualization server.

20. The server of claim 19, wherein the one or more processors are further configured to:

store the second set of resource associations in a cache coupled to the one or more processors; and clear the cache in response to a termination of the computing session with the broker server.

21. The server of claim 18, wherein the storage provider is a remote storage provider.

* * * * *